United States Patent
Ohara et al.

(10) Patent No.: US 8,334,500 B2
(45) Date of Patent: Dec. 18, 2012

(54) SYSTEM FOR REDUCING DEFOCUSING OF AN OBJECT IMAGE DUE TO TEMPERATURE CHANGES

(75) Inventors: Naoto Ohara, Tokyo (JP); Yusuke Hayashi, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 653 days.

(21) Appl. No.: 12/491,665

(22) Filed: Jun. 25, 2009

(65) Prior Publication Data

US 2009/0321618 A1 Dec. 31, 2009

Related U.S. Application Data

(63) Continuation-in-part of application No. PCT/JP2007/075204, filed on Dec. 27, 2007.

(30) Foreign Application Priority Data

Dec. 27, 2006 (JP) ................................ 2006-351638
Apr. 25, 2007 (JP) ................................ 2007-115718

(51) Int. Cl.
*H01J 3/14* (2006.01)
*H01J 5/16* (2006.01)
(52) U.S. Cl. ..................... 250/216; 250/208.1; 359/689; 359/682; 348/340
(58) Field of Classification Search ............... 250/208.1, 250/208.2, 216; 359/689, 680, 692, 772, 359/771; 340/340
See application file for complete search history.

(56) References Cited

U.S. PATENT DOCUMENTS

| | | | |
|---|---|---|---|
| 3,739,089 A | 6/1973 | Latall | |
| 5,664,243 A | 9/1997 | Okada et al. | |
| 5,748,371 A | 5/1998 | Cathey, Jr. et al. | |
| 6,021,005 A | 2/2000 | Cathey, Jr. et al. | |
| 6,069,738 A | 5/2000 | Cathey, Jr. et al. | |
| 6,148,528 A | 11/2000 | Jackson | |
| 6,233,060 B1 | 5/2001 | Shu et al. | |
| 6,241,656 B1 | 6/2001 | Suga | |
| 6,449,087 B2 | 9/2002 | Ogino | |
| 6,525,302 B2 | 2/2003 | Dowski, Jr. et al. | |
| 6,606,669 B1 | 8/2003 | Nakagiri | |
| 6,642,504 B2 | 11/2003 | Cathey, Jr. | |

(Continued)

FOREIGN PATENT DOCUMENTS

JP S63-229851 A 9/1988

(Continued)

OTHER PUBLICATIONS

Office Action dated Mar. 10, 2010 issued for U.S. Appl. No. 11/773,792.

(Continued)

*Primary Examiner* — Francis M Legasse, Jr.
(74) *Attorney, Agent, or Firm* — Procopio, Cory, Hargreaves & Savitch LLP

(57) ABSTRACT

An image pickup apparatus operable to reduce defocusing due to temperature changes is disclosed. An optical system comprises a glass lens and a plastic lens, wherein a power of the plastic lenses is smaller than that of the glass lens. An image pickup device picks up an object image that has passed through the optical system as a defocused object image including an area with a large-depth-of-field light and a blurred area. An image processing device generates an image signal with a smaller blur than the blurred object image from the image pickup device.

19 Claims, 32 Drawing Sheets

U.S. PATENT DOCUMENTS

| | | |
|---|---|---|
| 6,984,206 B2 | 1/2006 | Kumei et al. |
| 7,158,660 B2 | 1/2007 | Gee et al. |
| 7,400,393 B2 | 7/2008 | Shibata et al. |
| 7,583,301 B2 | 9/2009 | Sakurai et al. |
| 7,630,584 B2 | 12/2009 | Nose et al. |
| 7,719,772 B2 | 5/2010 | Mann et al. |
| 2002/0118457 A1 | 8/2002 | Dowski |
| 2003/0076514 A1 | 4/2003 | Gallagher et al. |
| 2003/0122926 A1 | 7/2003 | Kumei et al. |
| 2003/0158503 A1 | 8/2003 | Matsumoto |
| 2003/0206322 A1* | 11/2003 | Atsuumi et al. .............. 359/205 |
| 2004/0136605 A1 | 7/2004 | Seger et al. |
| 2004/0190762 A1 | 9/2004 | Dowski et al. |
| 2004/0257677 A1 | 12/2004 | Matsusaka |
| 2005/0128342 A1 | 6/2005 | Izukawa |
| 2005/0200972 A1* | 9/2005 | Nose et al. .................... 359/689 |
| 2006/0012385 A1 | 1/2006 | Tsao et al. |
| 2007/0086674 A1 | 4/2007 | Guan |
| 2007/0268376 A1 | 11/2007 | Yoshikawa et al. |
| 2007/0291152 A1 | 12/2007 | Suekane et al. |
| 2008/0007797 A1 | 1/2008 | Hayashi |
| 2008/0043126 A1 | 2/2008 | Hayashi |
| 2008/0074507 A1 | 3/2008 | Ohara et al. |
| 2008/0081996 A1 | 4/2008 | Grenon et al. |
| 2008/0259275 A1 | 10/2008 | Aoki et al. |
| 2008/0278592 A1 | 11/2008 | Kuno et al. |

FOREIGN PATENT DOCUMENTS

| | | | |
|---|---|---|---|
| JP | H03-010380 A | 1/1991 | |
| JP | H03-175403 A | 7/1991 | |
| JP | H06-130267 A | 5/1994 | |
| JP | H08-128923 A | 5/1996 | |
| JP | H10-145667 A | 5/1998 | |
| JP | H11-261868 A | 9/1999 | |
| JP | 2000-050146 A | 2/2000 | |
| JP | 2000-098301 A | 7/2000 | |
| JP | 2000-266979 A | 9/2000 | |
| JP | 2000-275582 A | 10/2000 | |
| JP | 2001-257930 A | 9/2001 | |
| JP | 2001-346069 A | 12/2001 | |
| JP | 2002-027047 | 1/2002 | |
| JP | 2002-127852 A | 5/2002 | |
| JP | 2002-221657 | 9/2002 | |
| JP | 2003-185905 A | 7/2003 | |
| JP | 2003-235794 | 8/2003 | |
| JP | 2003-244530 A | 8/2003 | |
| JP | 2003-248171 A | 9/2003 | |
| JP | 2003-262778 A | 9/2003 | |
| JP | 2003-283878 A | 10/2003 | |
| JP | 2004-037733 | 2/2004 | |
| JP | 2004-147188 | 5/2004 | |
| JP | 2004-153497 | 5/2004 | |
| JP | 2004-264577 A | 9/2004 | |
| JP | 2004-328506 A | 11/2004 | |
| JP | 2005-326684 A | 11/2004 | |
| JP | 2006-139246 A | 1/2006 | |
| JP | 2006-049949 | 2/2006 | |
| JP | 2006-094112 A | 4/2006 | |
| JP | 2006-154767 A | 6/2006 | |
| JP | 2006-308987 A | 11/2006 | |
| JP | 2007-060647 A | 3/2007 | |
| JP | 2007-300208 A | 11/2007 | |
| JP | 2008-017157 A | 1/2008 | |
| JP | 2008-035282 A | 2/2008 | |
| WO | 2006/022373 A1 | 3/2006 | |
| WO | 2007-013621 A1 | 2/2007 | |
| WO | 2007/074679 A1 | 7/2007 | |

OTHER PUBLICATIONS

Final Office Action dated Aug. 18, 2010 issued for U.S. Appl. No. 11/773,792.

Office Action dated Jun. 10, 2010 issued for U.S. Appl. No. 11/861,217.

International Search Report dated May 12, 2009 issued by the Japanese Patent Office for International Application No. PCT/JP2009/056376.

Office Action dated Jan. 19, 2011 issued by the Japanese Patent Office for Japanese Application No. JP 2006-259646.

Dowski, Edward R. Jr., et al., "Extended Depth of Field through Wave-Front Coding", Appl. Opt. vol. 34, p. 1859-1866 (1995).

Edward R Dowski, Jr., Robert H. Cormack, Scott D. Sarama, Wavefront Coding: jointly optimized optical and digital imaging systems, CDM Optics, Inc., Boulder, CO, Army Research Laboratory, Adelphi, MD, Jun. 2000.

Edward R Dowski, Gregory E. Johnson, Wavefront Coding: A modern method of achieving high performance and/or low cost imaging systems, CDM Optics, Inc. Boulder, CO, Oct. 1999.

* cited by examiner

STATE OF LIGHT BEAM IN OPTICAL SYSTEM

SPOT IMAGES OF OPTICAL SYSTEM

JAN

CODE49

QR CODE

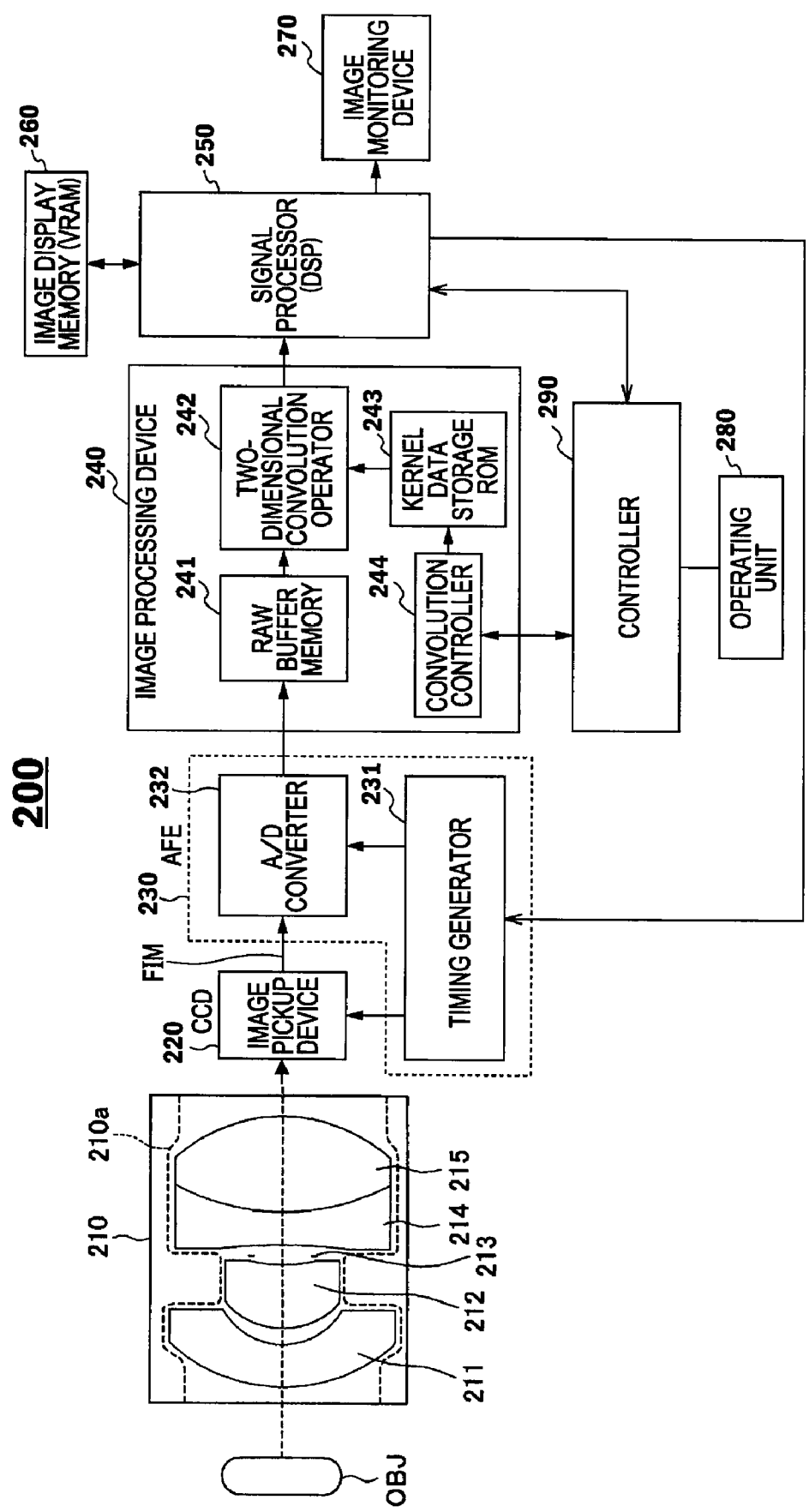

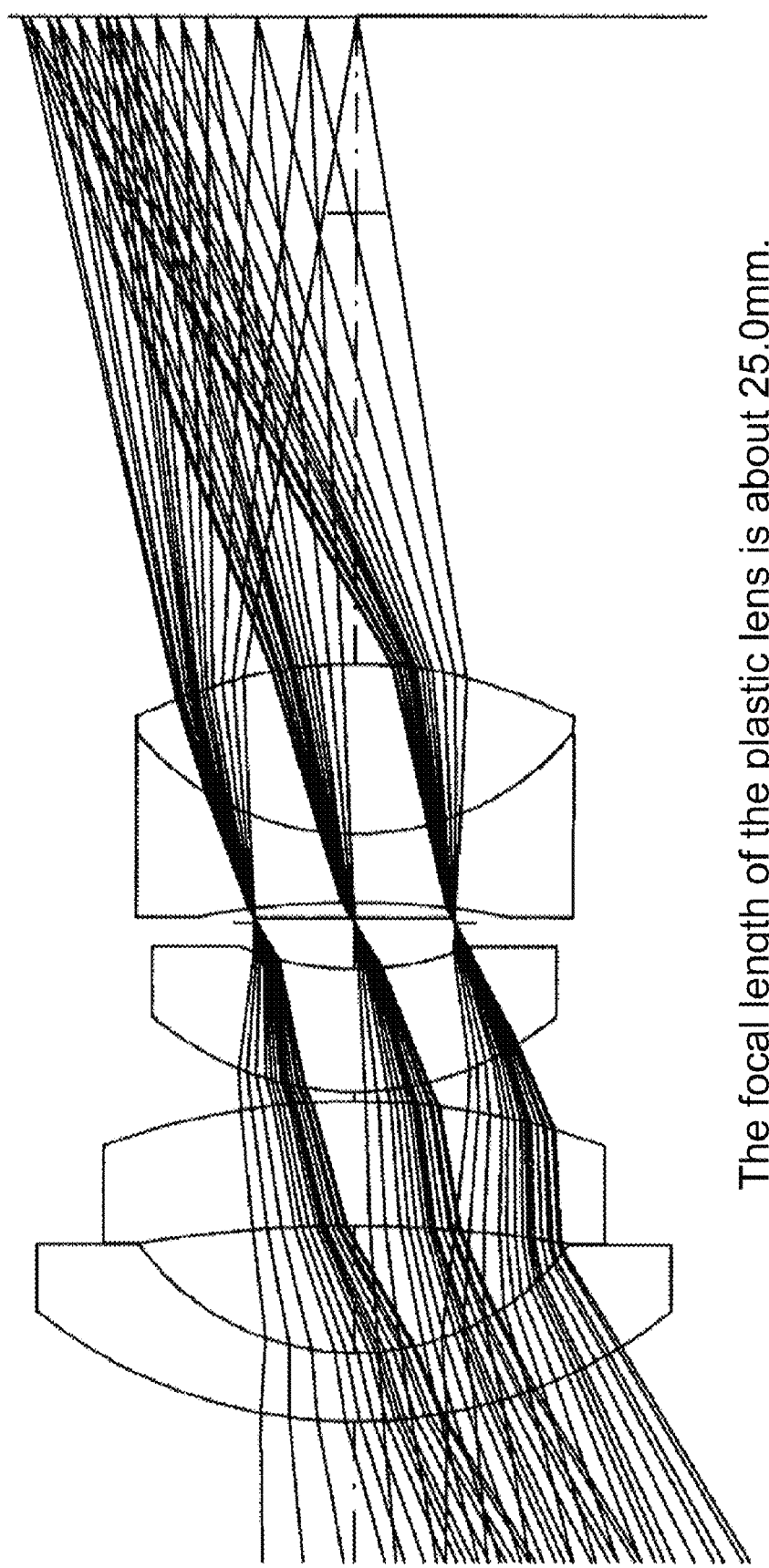

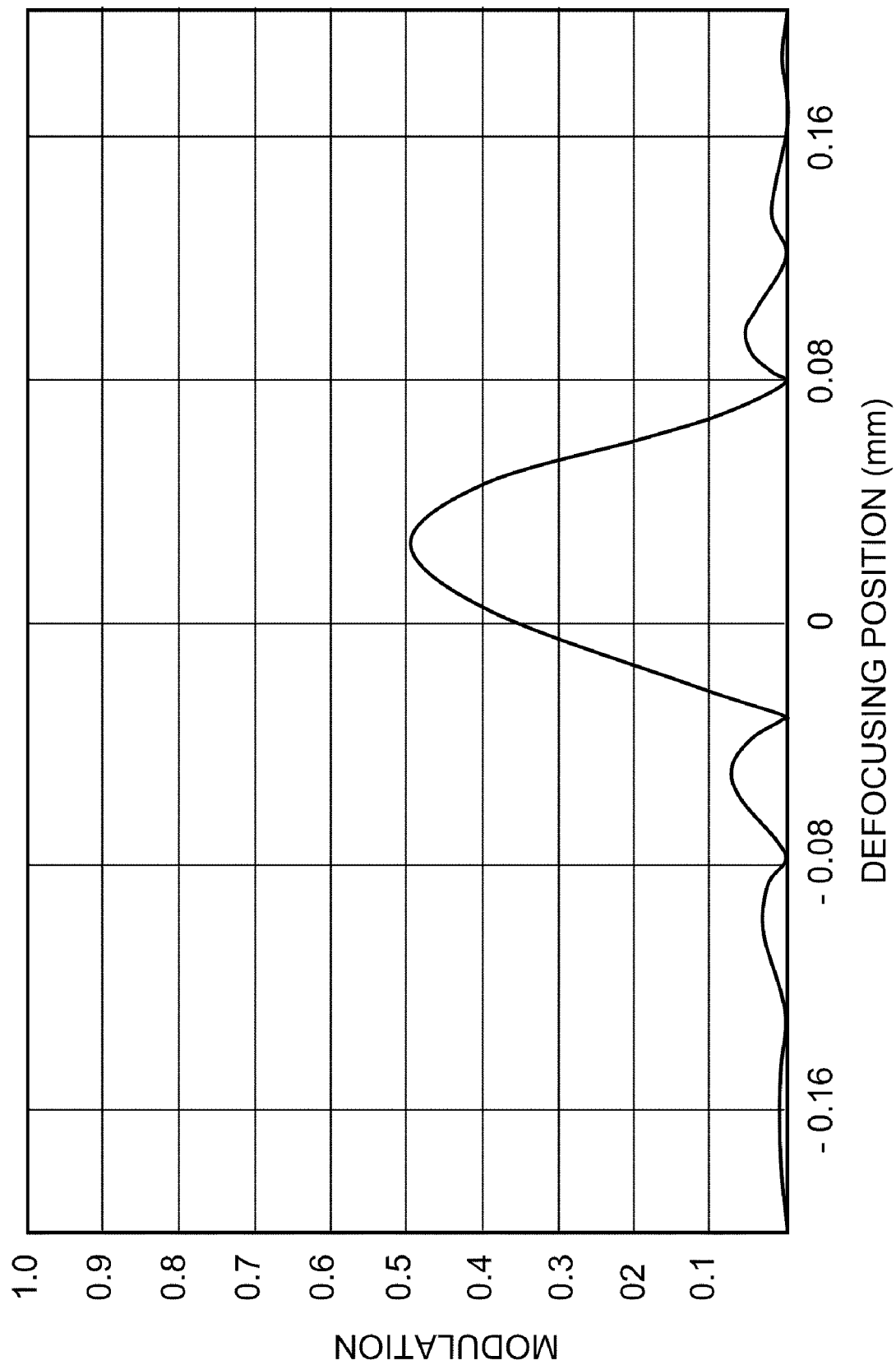

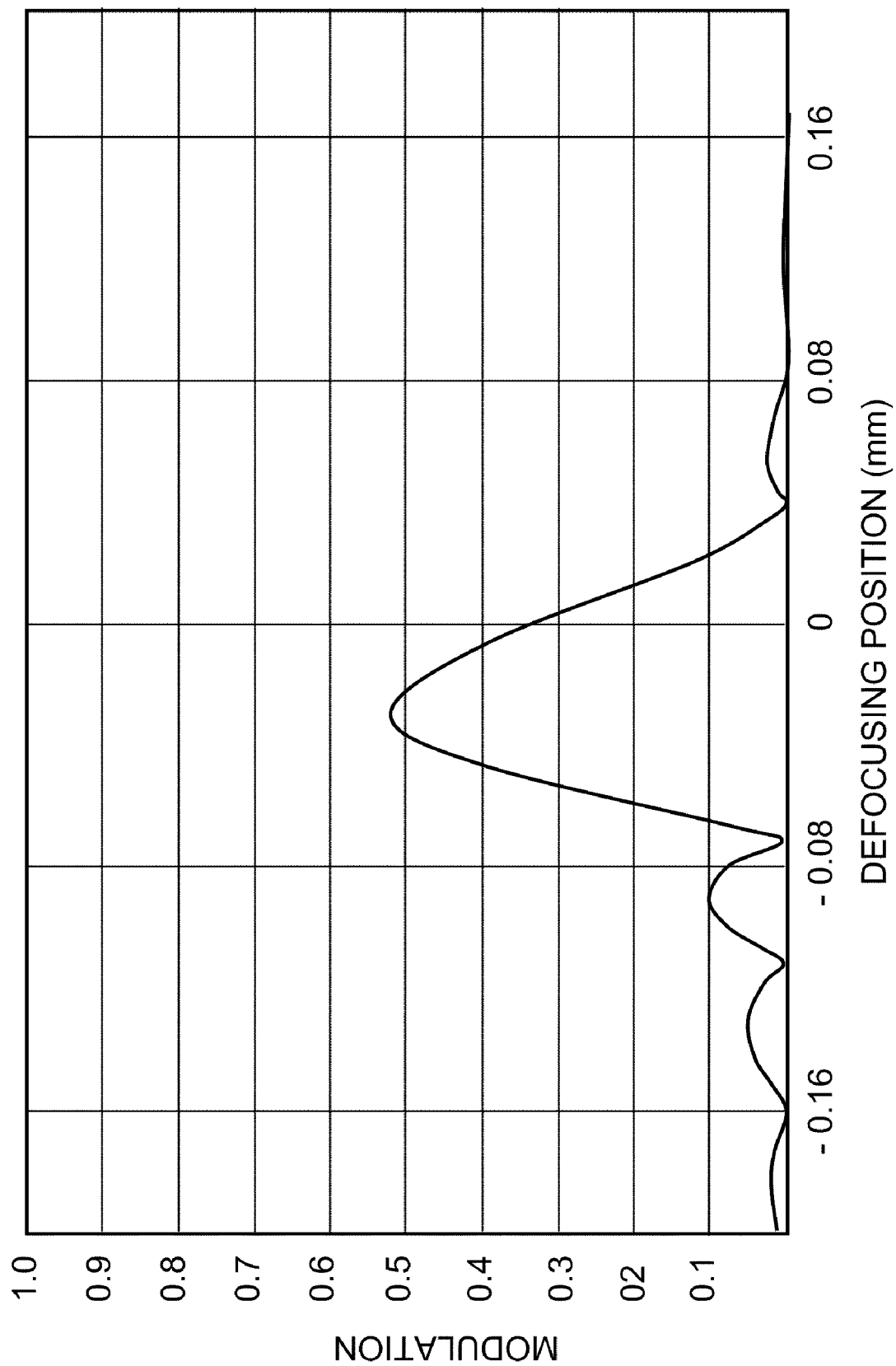

The focal length of the plastic lens is about 14.8mm.

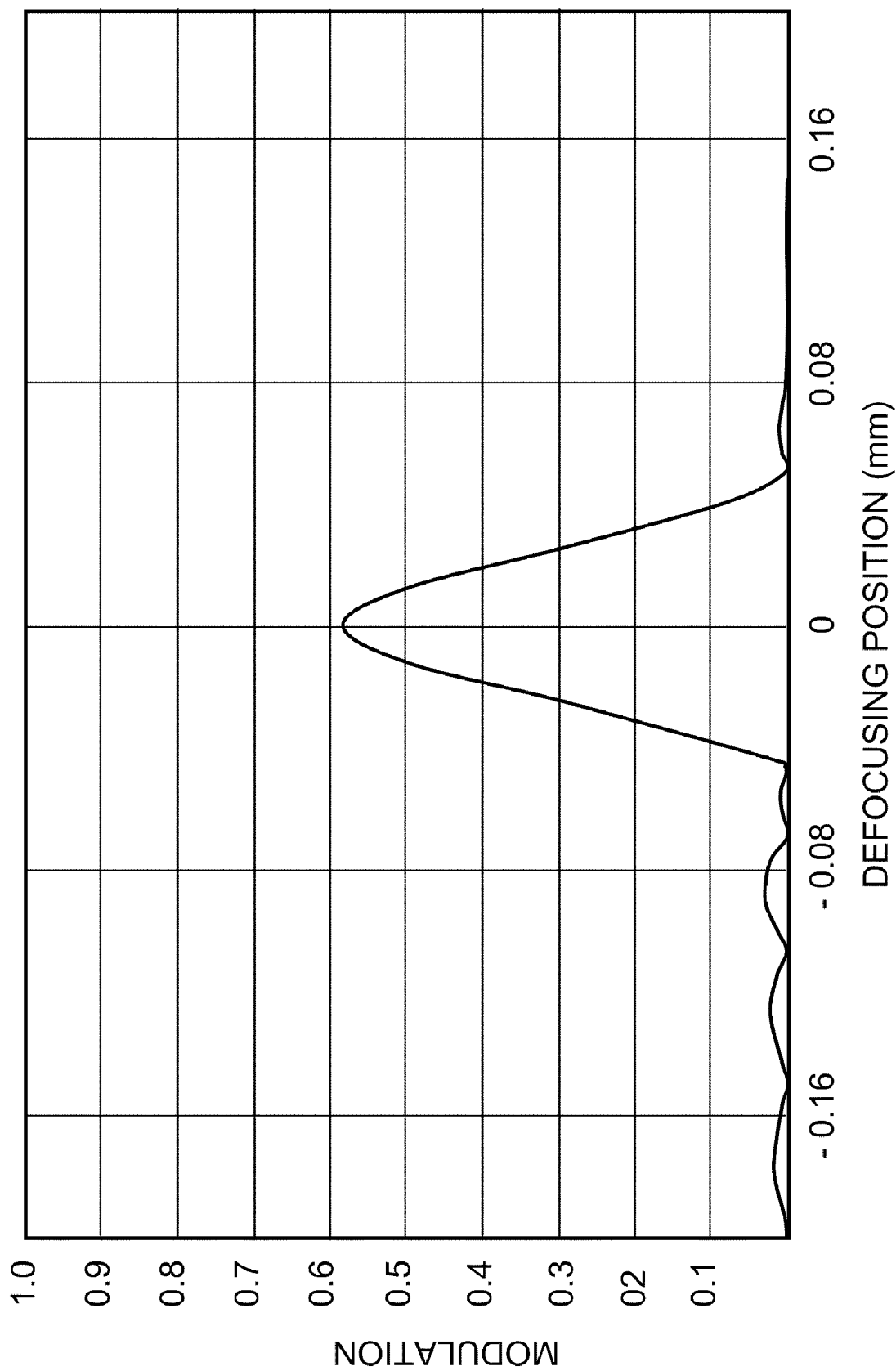

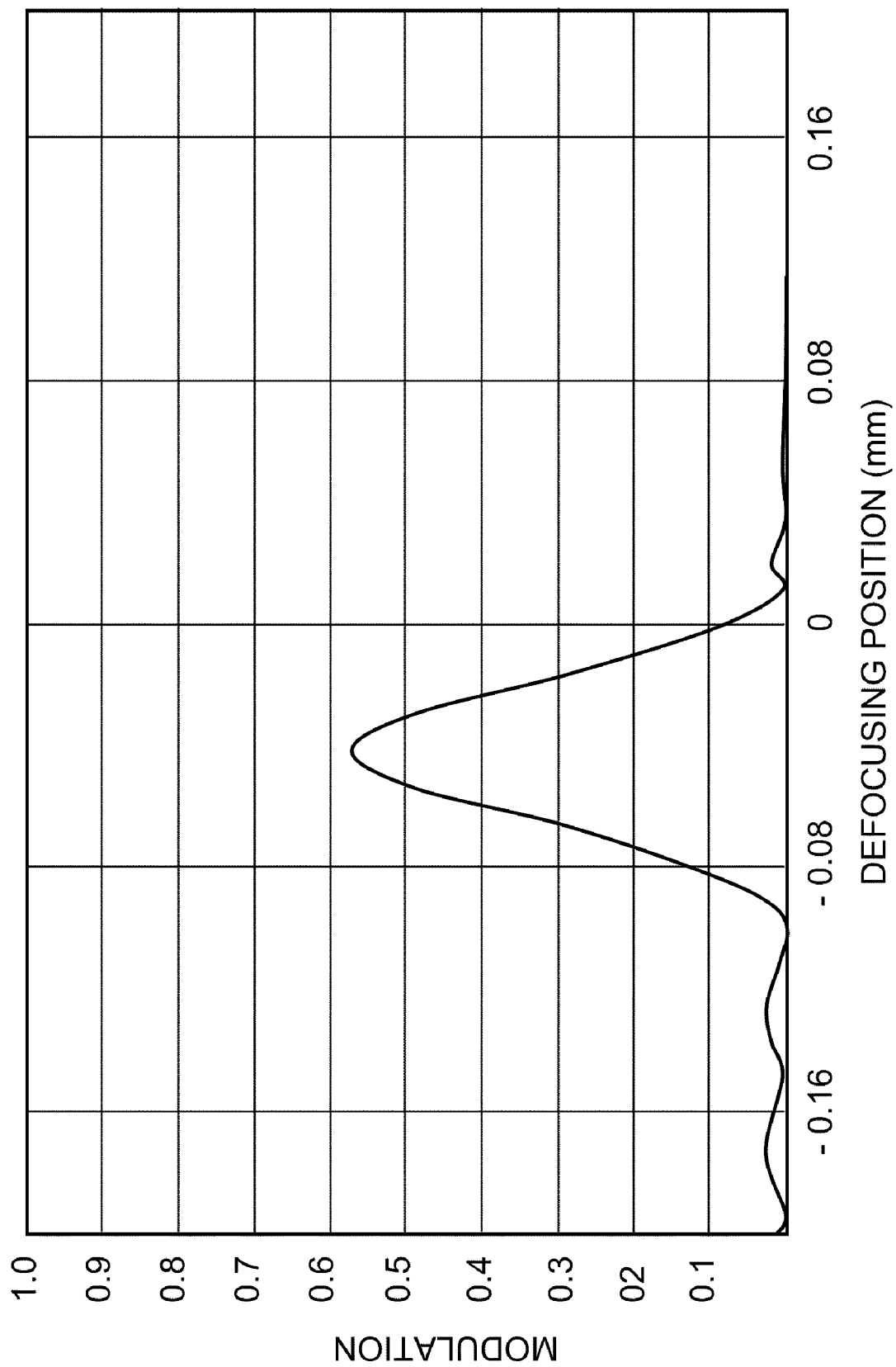

FIG. 23

EXAMPLE OF KERNEL DATA STORAGE ROM

| OPTICAL MAGNIFICATION | ×1.5 | ×5 | ×10 |
|---|---|---|---|
| KERNEL DATA | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FIG. 24

EXAMPLE OF KERNEL TABLE

| APERTURE STOP | F2.8 | F4 |
|---|---|---|
| KERNEL | A | B |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

FIG. 25

EXAMPLE OF KERNEL TABLE

| OBJECT DISTANCE INFORMATION | 100 mm | 500 mm | 4 m |
|---|---|---|---|
| KERNEL | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

SYSTEM FOR REDUCING DEFOCUSING OF AN OBJECT IMAGE DUE TO TEMPERATURE CHANGES

CROSS-REFERENCE TO RELATED APPLICATION

The present application is a continuation in part based on PCT Application No. JP2007/075204, filed on Dec. 27, 2007, which claims the benefit of Japanese Application No. 2006-351638, filed on Dec. 27, 2006, and Japanese Application No. 2007-115718, filed on Apr. 25, 2007 all entitled "IMAGE PICKUP APPARATUS AND INFORMATION CODE READER". The content of which are incorporated by reference herein in their entirety.

FIELD OF THE INVENTION

Embodiments of the present invention relates generally to image pickup devices, and more particularly relates to image pickup devices usable for information code reading.

BACKGROUND

With the rapid development of digitalization of information, digitalization in image processing is increasingly required. In digital cameras in particular, solid-state image pickup devices, such as Charge Coupled Devices (CCD) and Complementary Metal Oxide Semiconductor (CMOS) sensors, have been provided mainly on imaging planes instead of films.

In image pickup apparatuses including CCDs or CMOS sensors, an image of an object is optically taken by an optical system and is extracted by an image pickup device in a form of an electric signal. In one image pickup apparatus, light is regularly dispersed by a phase plate and is reconstructed by digital processing to achieve a large depth of field.

Devices like CCD and CMOS sensors that have image input functions sometimes read close-up still images, such as bar codes, together with desired images, such as landscape images. Techniques used for reading bar codes include an auto-focus technique in which focusing is performed by moving a lens towards and away from the bar code and a depth expansion technique in which the depth of field is increased by reducing the F-number in a camera so as to achieve fixed focus.

In some image pickup apparatuses, a Point Spread Function (PSF) obtained is constant when the above-described phase plate is placed in the optical system. The PSF describes the response of an imaging system to a point source or point object. The degree of spreading (blurring) of the point object is a measure for the quality of an imaging system. If the PSF varies, it can be difficult to obtain an image with a large depth of field by convolution using a kernel.

Therefore, setting single focus lens systems aside, in lens systems like zoom systems and autofocus (AF) systems, high precision is required in the optical design, thereby increasing costs accordingly. In one automatic exposure control system for a digital camera, filtering process using a transfer function is performed. More specifically, in known image pickup apparatuses, a suitable convolution operation cannot be performed and the optical system should be designed to eliminate aberrations, such as astigmatism, coma aberration, and zoom chromatic aberration that cause a displacement of a spot image at wide angle and telephoto positions. However, eliminating the aberrations can increase the complexity of the optical design, the number of design steps, the costs, and the lens size.

In a depth expansion technique, although a desired depth of field can be achieved at normal temperature, the back-focus position changes depending on high temperature or low temperature, causing the focal point to vary. Furthermore, a temperature change can possibly cause the lens to become loose or crack. In addition, if a plastic lens has high power, the performance thereof can vary significantly in response to a temperature change, making it difficult to achieve a satisfactory image quality even by performing a restoring process. Moreover, the depth of field varies depending on the surrounding environment.

Accordingly, there is a need for an image pickup apparatus which can reduce the change in the characteristics of lenses, reduce the degradation of the lens characteristics due to high or low temperature, and reduce the degradation in characteristics of back focusing change.

SUMMARY

An image pickup apparatus operable to reduce defocusing due to temperature changes is disclosed. An optical system comprises one or more glass lens and one or more plastic lens, wherein the power of the plastic lenses is smaller than that of the glass lenses. An image pickup device picks up an object image that has passed through the optical system as a defocused object image including an area with a large-depth-of-field light and a blurred area. An image processing device generates an image signal with a smaller blur than the blurred object image received from the image pickup device.

A first embodiment comprises an image pickup apparatus. The image pickup apparatus comprises an optical system comprising one or more glass lenses and one or more plastic lenses, wherein a power of the plastic lenses is lower than a power of the glass lenses and a power of the optical system respectively. The image pickup apparatus further comprises an image pickup device operable to pick up an object image that has passed through the optical system as an out-of-focus dispersed object image comprising an area with a large-depth-of-field light and a blurred area. The image pickup apparatus also comprises an image processing device operable to generate an image signal with a smaller blur than that of a signal of a blurred object image output from the image pickup device.

A second embodiment comprises an information reading device. The information reading device comprises an image pickup apparatus operable to form an image, comprising an optical system comprising one or more glass lenses and one or more plastic lenses. A power of the plastic lenses is smaller than a power of the glass lenses and a power of the optical system. The image pickup apparatus further comprises an image pickup device operable to pick up an object image that has passed through the optical system as a dispersed object image which is out of focus thereon and comprise an area with a large-depth-of-field light and a blurred area. The image pickup apparatus also comprises an image processing device operable to generate an image signal with a smaller blur than that of a signal of a blurred object image output from the image pickup device. The information reading device further comprises a camera signal processor operable to receive the image from the image pickup apparatus.

A third embodiment comprises an image pickup apparatus. The image pickup apparatus comprises an optical system comprising one or more glass lenses and one or more plastic lenses, wherein the power of the plastic lenses is smaller than that of the glass lenses and that of the optical system. The image pickup apparatus further comprises image pickup means operable to pick up an object image that has passed through the optical system as a dispersed object image which is out of focus thereon and comprise an area with a large-depth-of-field light and a blurred area. The image pickup apparatus also comprises image processing means operable to generate an image signal with a smaller blur than that of a signal of a blurred object image output from the image pickup means.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

FIG. 5 is a block diagram showing a configuration example of an information code reading device applicable to the information code reading device of FIG. 1.

FIGS. 18A to 18D illustrate back-focus shift occurring in response to a temperature change in example 2 where the plastic lens has reduced power.

FIGS. 19A to 19D illustrate back-focus shift occurring in response to a temperature change in example 3 where the plastic lens has not reduced power.

FIG. 23 is a diagram illustrating an exemplary of data stored in a kernel data ROM (optical magnification) according to an embodiment of the invention.

FIG. 24 is a diagram illustrating another exemplary of data stored in a kernel data ROM (F number) according to an embodiment of the invention.

FIG. 25 is a diagram illustrating another exemplary of data stored in a kernel data ROM (object distance information) according to an embodiment of the invention.

DETAILED DESCRIPTION OF EXEMPLARY EMBODIMENTS

The following detailed description is exemplary in nature and is not intended to limit the disclosure or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely, information code reading. Embodiments of the invention, however, are not limited to such code reading applications, and the techniques described herein may also be utilized in other imaging applications. For example, embodiments may be applicable to microphotography.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

The following description is presented to enable a person of ordinary skill in the art to make and use the embodiments of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the embodiments of the present invention. Thus, the embodiments of the present invention are not intended to be limited to the examples described herein and shown, but are to be accorded the scope consistent with the claims.

Figure 1:
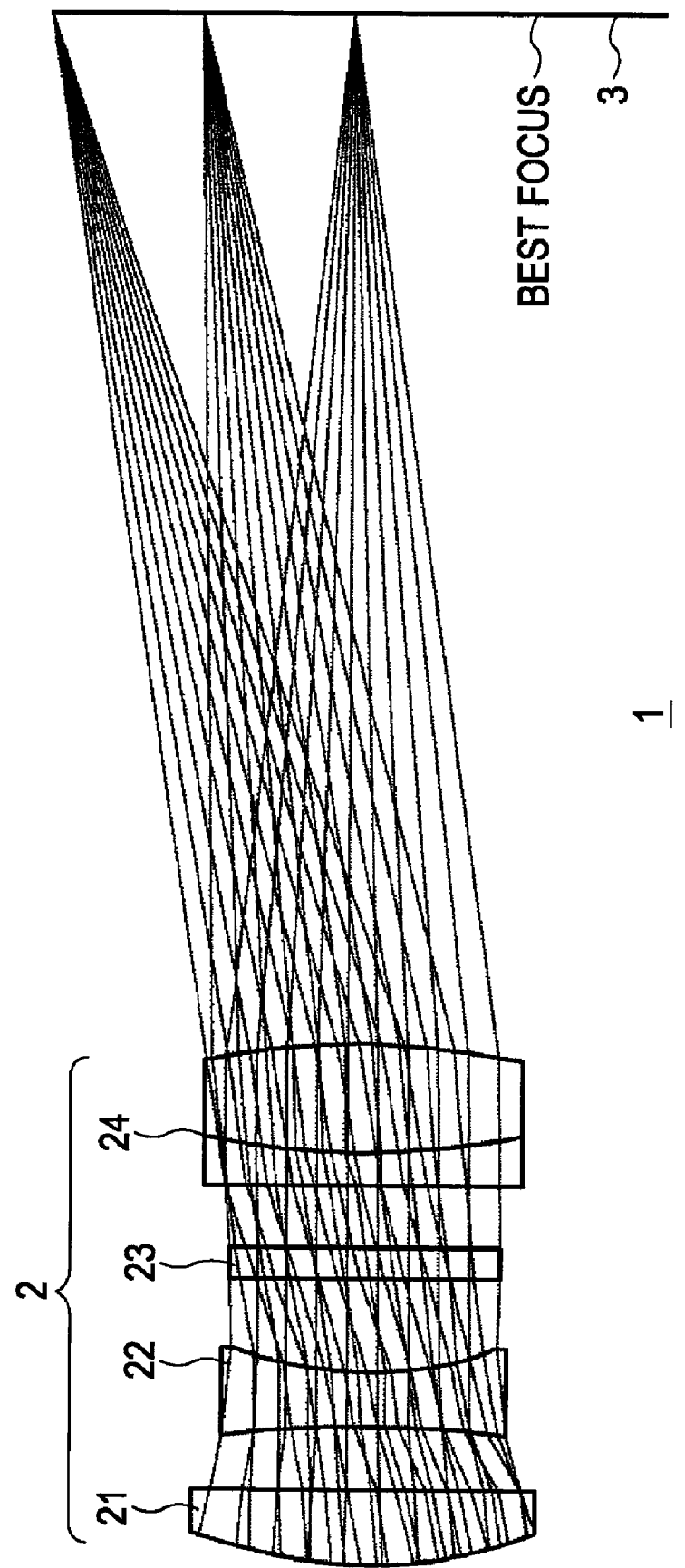
FIG. 1 is a schematic diagram illustrating the structure of an existing image pickup apparatus and traces of light ray bundles.

FIG. 1 is a schematic diagram illustrating a structure of an image pickup apparatus and traces of light ray bundles. The image pickup apparatus 1 comprises an optical system 2 and an image pickup device 3. The image pickup device 3 may be a semiconductor sensor such as a CCD and a CMOS sensor. The optical system 2 includes object-side lenses 21 and 22, an aperture stop 23, and an imaging lens 24 arranged in order from an object side (OBJS) toward the image pickup device 3.

Figure 2A:
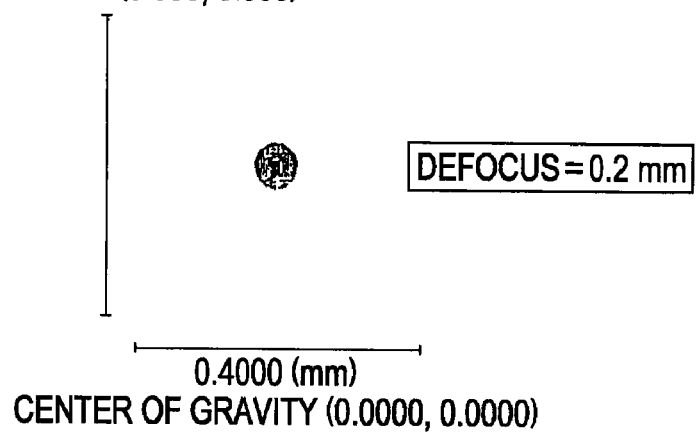
FIG. 2A illustrates spot images formed on a light-receiving surface of an image pickup device in the image pickup apparatus shown in FIG. 1 when a focal point is displaced by 0.2 mm (Defocus=0.2 mm).
Figure 2B:
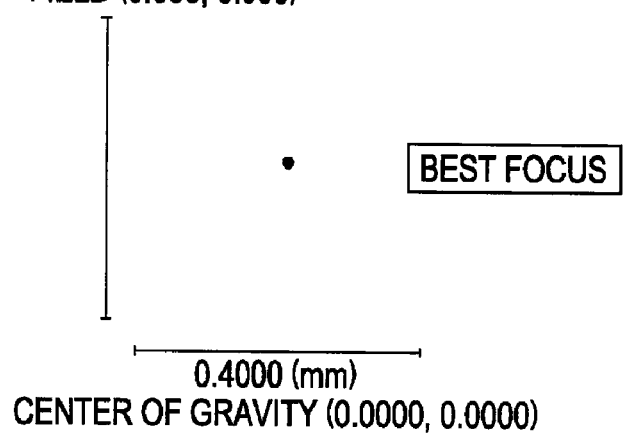
FIG. 2B illustrates spot images formed on a light-receiving surface of an image pickup device in the image pickup apparatus shown in FIG. 1 when the focal point is not displaced (Best focus).
Figure 2C:
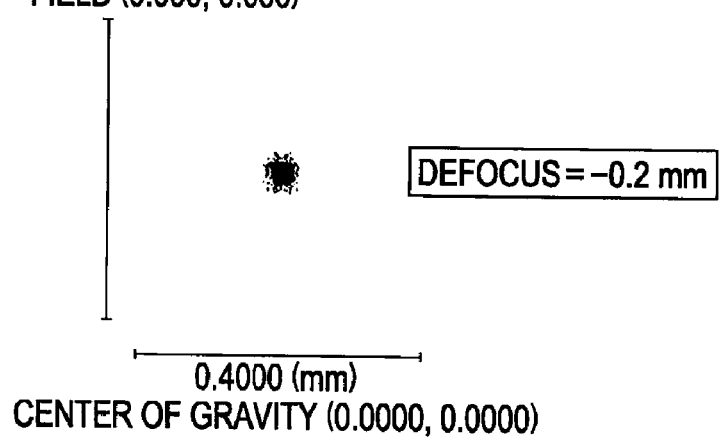
FIG. 2C illustrates spot images formed on a light-receiving surface of an image pickup device in the image pickup apparatus shown in FIG. 1 when the focal point is displaced by −0.2 mm (Defocus=−0.2 mm).

Referring to FIG. 1, in the image pickup apparatus 1, the best-focus plane coincides with the plane on which the image pickup device is located. FIG. 2A to 2C illustrate spot images formed on a light-receiving surface of an image pickup device 3 in the image pickup apparatus 1 shown in FIG. 1 when a focal point is displaced by 0.2 mm (Defocus=0.2 mm), when the focal point is not displaced (Best focus) or when the focal point is displaced by −0.2 mm (Defocus=−0.2 mm), individually.

Figure 3:
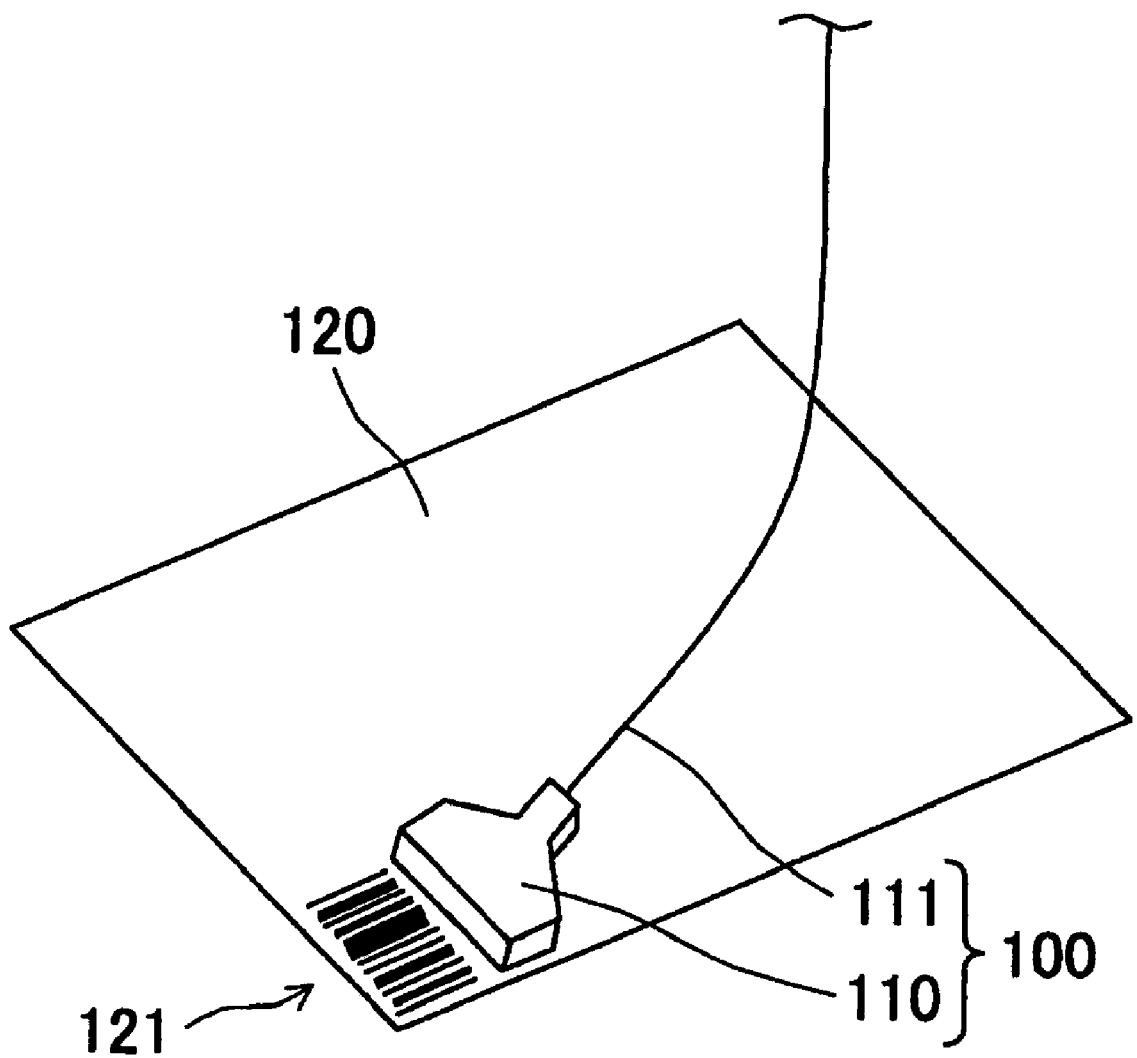
FIG. 3 is an outer appearance view showing one example of an information code reading device serving as an electronic device according to an embodiment of the present invention.
Figure 4A:
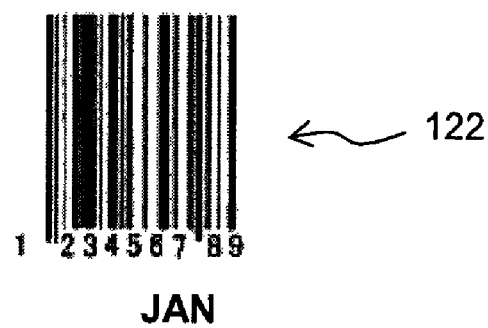
FIG. 4A shows an example of a JAN code.
Figure 4B:
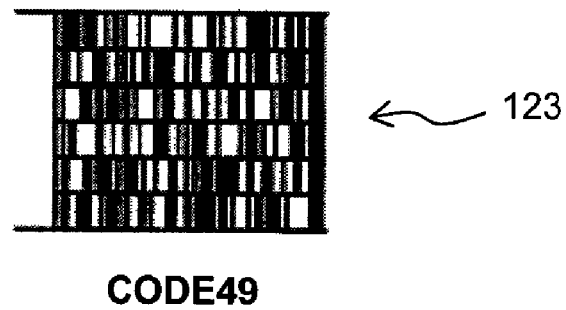
FIG. 4B shows an example of a CODE 49.
Figure 4C:
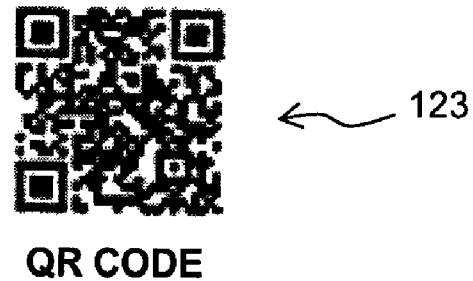
FIG. 4C shows an example of a QR code.

FIG. 3 illustrates an outer appearance view showing one example of an information code reading device serving as an electronic device according to an embodiment of the present invention. FIGS. 4A to 4C are views showing an example of an information code. FIG. 5 is a block diagram showing a configuration example of an information code reading device applicable to the information code reading device of FIG. 1.

As shown in FIG. 3, the information code reading device 100 according to the present embodiment includes a main body 110 which is connected with a processing device such as an electronic register (not shown) by way of a cable 111. The information code reading device 100 is capable of reading an information code 121 such as a symbol and a code having different reflectivity printed on a reading object 120 and the like.

The information code to be read may be a one-dimensional barcode 122 such as the JAN code shown in FIG. 4A, or a two-dimensional barcode 123 such as a stack-type CODE 49 shown in FIG. 2B or a matrix type QR code shown in FIG. 2C.

According to an embodiment of the invention, the main body 110 of the information code reading device 100 (device 100) includes a light source (not shown) and an imaging device 200 shown in FIG. 5. The image pickup device 1 includes a wavefront-aberration control optical system having a light wavefront modulation element provided in an optical system. In device 100, a light beam is orderly dispersed by the light wavefront modulation element and is restored by digital processing, whereby an image with a large depth of field can be picked up.

The wavefront-aberration control optical system may be called a Depth Expansion Optical System which results in a highly accurate and adequate reading of information codes such as one-dimensional barcode 122 such as the JAN code shown in FIG. 4A, or a two-dimensional barcode 123 such as a stack-type CODE 49 or a matrix type QR code.

As shown in FIG. 5, the imaging device 200 includes an optical system 210 and an image pickup device 220 (imaging element 220). The imaging device 200 further includes an analog front end unit (AFE) 230, an image processing device 240, a camera signal processing unit 250, an image display memory 260, an image monitoring device 270, an operation unit 280, and a control device 290.

Figure 6:
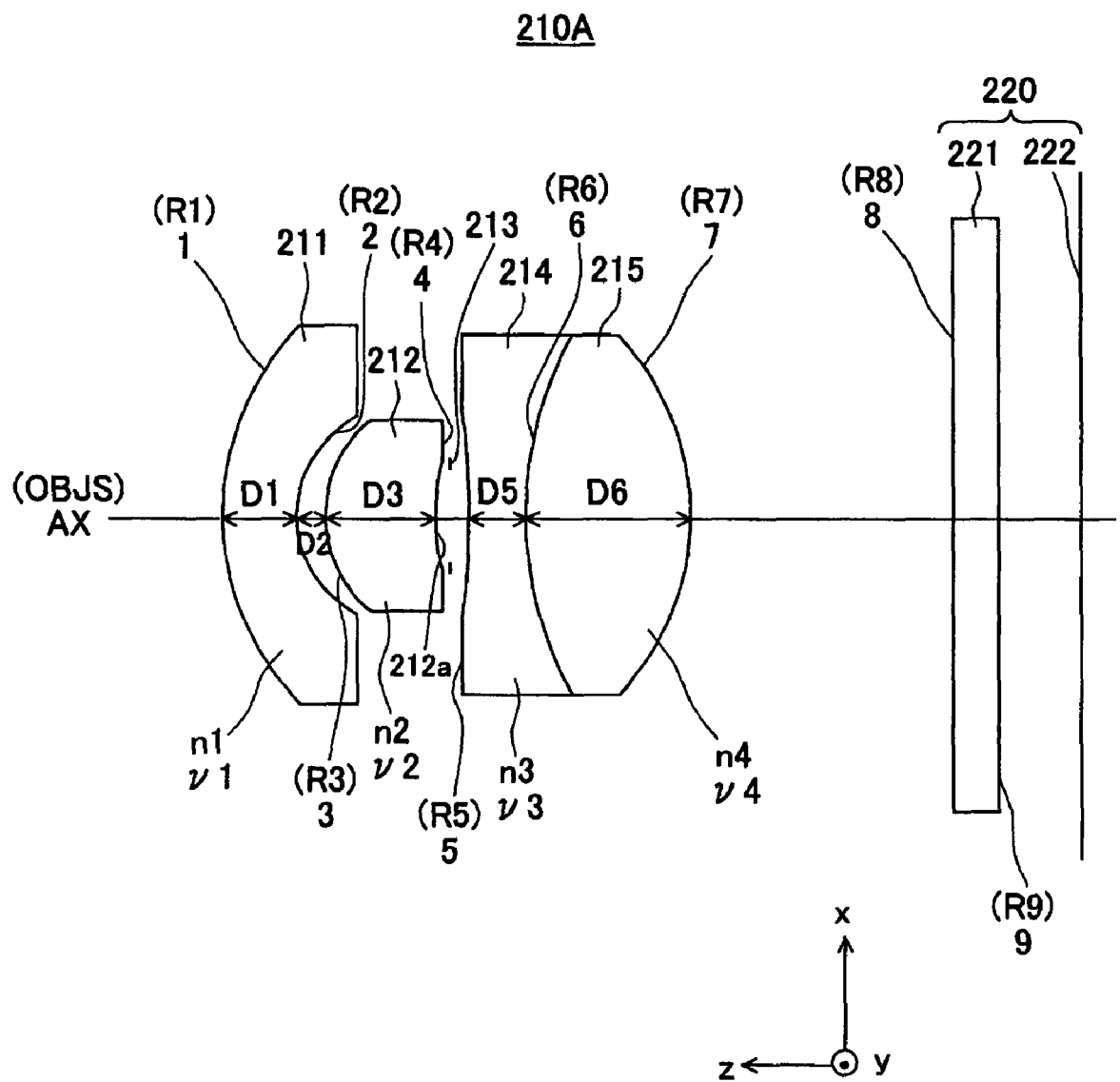
FIG. 6 shows a basic configuration example of an imaging lens unit included in the optical system.

FIG. 6 shows a basic configuration example of an imaging lens unit included in the optical system.

The optical system 210A provides an image of an object OBJ to the image pickup device 220. The optical system 210A includes a first lens 211, a second lens 212, an aperture stop 113, a third lens 214 and a fourth lens 215. The first lens 211, the second lens 212, the aperture 213, the third lens 214 and the fourth lens 215 locate in this order from the object side. The third lens 214 and the fourth lens 215 may be joined. That is, the optical system 210 may include a compound lens.

In the embodiment shown in FIG. 6, the first lens 211, the third lens 214 and the fourth lens 215 are composed of, but not limited to glass and the second lens 212 is composed of, but not limited to plastic. Since plastic has a greater linear expansion coefficient than glass and reacts sensitively to a temperature change, controlling the power of a plastic lens allows for favorable performance from low temperature to high temperature, thereby alleviating the effect of temperature change on the depth of field in a depth expansion optical system.

The optical system 210A includes one or more plastic lenses and one or more glass lenses. The total power of the plastic lenses is positive. A lens frame includes the first holder and a second holder, and may also include an intermediate member. By adjusting the fixed positions of the first holder and the second holder or the linear expansion coefficients of the two holders, back-focus shift occurring in response to a temperature change can be alleviated. With this adjustment, deviation in the back-focus position can be controlled, thereby allowing for sufficient performance that can satisfy various needs from a low-temperature environment to a high-temperature environment. Moreover, a temperature change affecting the depth of field in a depth expansion optical system can be alleviated.

The power of the plastic lens may be set such that the total focal length thereof is about 15.0 mm or more.

Specifically, in the optical system, the total focal length of the plastic lens may be infinite. In other words, the power of the plastic lens may be set close to zero so as to alleviate the amount of power fluctuation of the plastic lens occurring in response to a temperature change.

The power of the plastic lens (i.e., the second lens) is set lower than the power of the glass lenses (i.e., the first, third, and fourth lenses), and is also set lower than the power of the optical system.

The linear expansion coefficient of a portion (e.g., the holders supporting the image pickup device) holding the lenses of the optical system may be lower than the linear expansion coefficient of the plastic lens.

In the optical system 210A, the light wavefront modulation element may be provided separately from the lenses or may be provided in the lenses. For example, the second lens may additionally have a light wavefront modulating function. A central region, centered on the optical axis (z in FIG. 6), of a face of the second lens closer to the image pickup face has a concave shape with predetermined curvature. With this concave shape, the second lens functions as a light wavefront modulation element.

Figure 7:
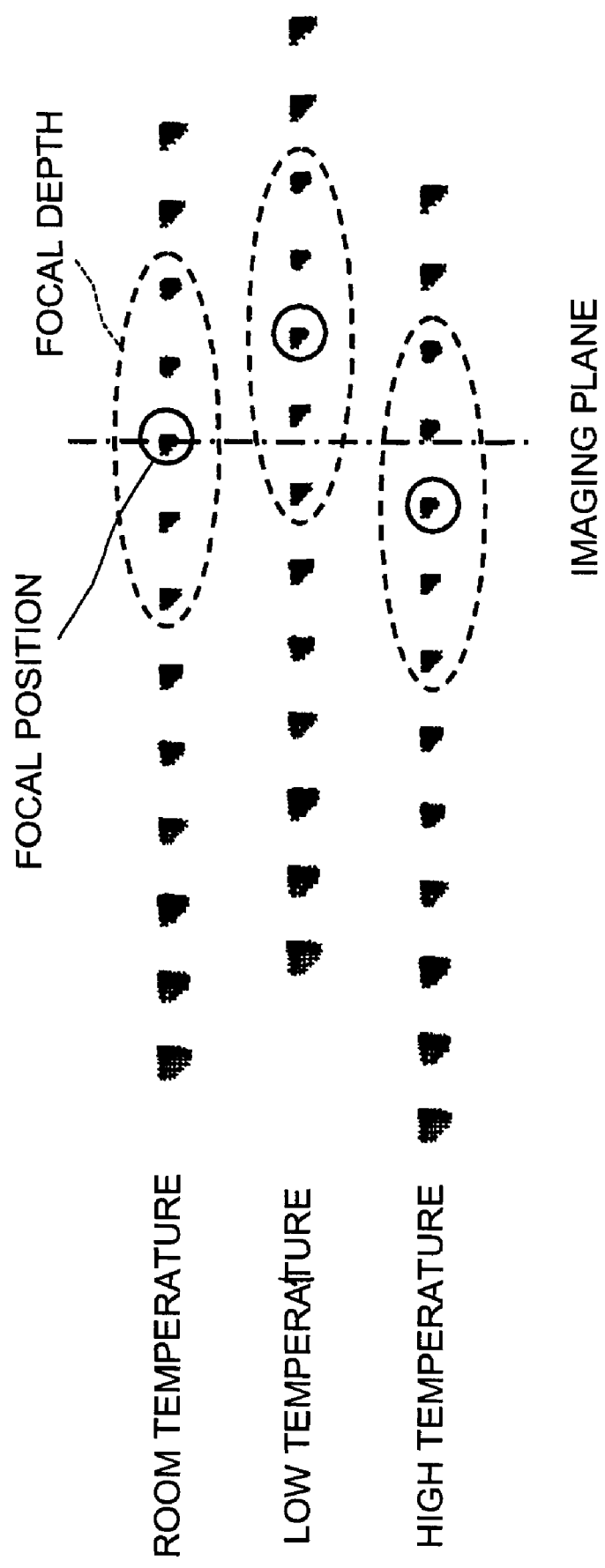
FIG. 7 illustrates a defocused state of an analog spot image obtained using a plastic lens with high negative power.
Figure 8:
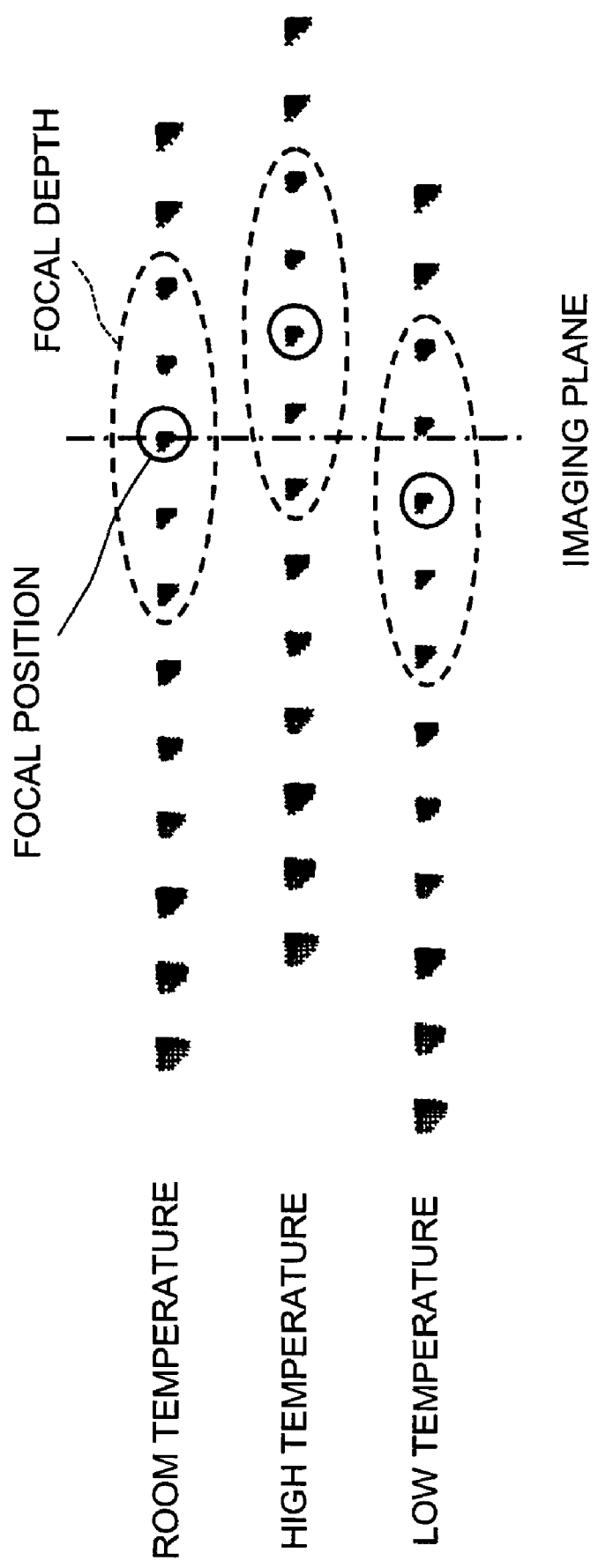
FIG. 8 illustrates a defocused state of an analog spot image obtained using a plastic lens with high positive power.
Figure 9:
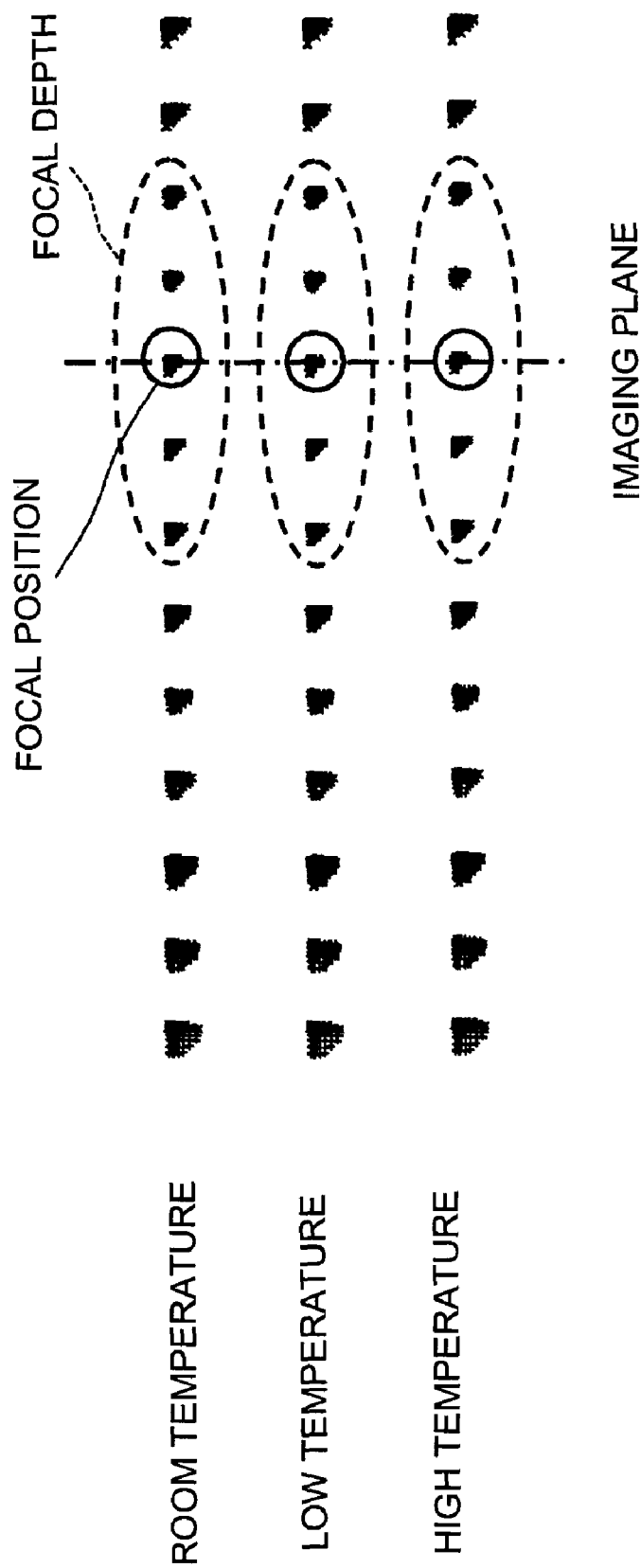
FIG. 9 illustrates a defocused state of an analog spot image obtained using a plastic lens with reduced power.

FIG. 7 illustrates a defocused state of an analog spot image obtained using a plastic lens with high negative power. FIG. 8 illustrates a defocused state of an analog spot image obtained using a plastic lens with high positive power. FIG. 9 illustrates a defocused state of an analog spot image obtained using a plastic lens with reduced power.

As shown in FIGS. 7 and 8, an analog spot image obtained using a plastic lens with high negative or positive power varies depending on normal temperature, high temperature, and low temperature. Therefore, satisfactory performance cannot be achieved.

In contrast, when the power of a plastic lens is lower than the power of a glass lens, and is also lower than the power of the optical system such as the optical system in the present embodiment, sufficient performance that can satisfy various needs from a low-temperature environment to a high-temperature environment is achieved as shown in FIG. 9. Moreover, a temperature change affecting the depth of field in a depth expansion optical system can be alleviated.

In the optical system 210A, the shape of the aspheric surface of the lens is expressed with the following aspheric surface equation with making the direction from the object side towards the image plane side positive, k as a conical coefficient, A, B, C, and D as aspheric surface coefficients, and r as a center curvature radius.

Furthermore, h represents the height of the light beam and c represents the inverse number of the center curvature radius, Z represents the depth from the tangent plane with respect to the plane vertex. Specifically, A is the aspheric surface coefficient of fourth order, B is the aspheric surface coefficient of sixth order, C is the aspheric surface coefficient of eighth order, and D is the aspheric surface coefficient of tenth order. Moreover, $\alpha$ and $\beta$ are phase plane coefficients, and x and y are directions shown in FIG. 4.
Aspheric Surface Equation;

$$Z = \frac{ch^2}{1+\sqrt{1-(1+k)c^2h^2}} + Ah^4 + Bh^6 + Ch^8 + Dh^{10} + \alpha(x^3+y^3) + \beta(x^5+y^5)$$

In the optical system 210A (i.e. image pickup lens unit) shown in FIG. 6, an object-side face 1 of a first lens 211 is set to have a center radius of curvature of R1, and an image-side face 2 of the first lens 211 is set to have a center radius of curvature of R2. An object-side face 3 of a second lens 212 is set to have a center radius of curvature of R3, and an image-side face 4 of the second lens 212 is set to have a center radius of curvature of R4. An object-side face 5 of a third lens 214 is set to have a center radius of curvature of R5, and an image-side face 5 of the third lens 212 is set to have a center radius of curvature of R5. An image-side face 7 of a fourth lens 215 is set to have a center radius of curvature of R7, and a fourth-lens-side face 8 of the cover glass 221 is set to have a center radius of curvature of R8 and a image-side face 9 of the cover glass 221 is set to have a center radius of curvature of R9. In this embodiment, R8 and R9 are zero without limitation.

The first lens 211 is set to have a refractive index of $\eta_1$ and a dispersion value of $v_1$. The second lens 212 is set to have a refractive index of $\eta_2$ and a dispersion value of $v_2$. The third lens 214 is set to have a refractive index of $\eta_3$ and a dispersion value of $v_3$. The fourth lens 215 is set to have a refractive index of $\eta_4$ and a dispersion value of $v_4$.

The image pickup device 220 is located such that a plane-parallel plate 221 (cover glass) composed of glass and an image pickup face 222 of the image pickup device 220 such as CCD or CMOS sensor are arranged in that order from a fourth lens. Light from an object OBJ via the image pickup optical system 210 forms an image on the image pickup face 222 of the image pickup device 220.

A dispersed object image picked up by the image pickup device 220 is out of focus on the image pickup device 220 and includes an area with a large-depth-of-field light beam and a blurred area. By additionally performing a filtering process in an image processing device 240, the resolution of the distance between two objects can be corrected.

The image pickup device 220 may include a CCD or a CMOS sensor on which the image received from the optical system 210 is formed and which outputs first image information representing the image formed thereon to the image processing device 240 via the AFE unit 230 as a first image electric signal (FIM). In the embodiment shown in FIG. 3, a CCD is shown as an example of the image pickup device 120.

The AFE unit 230 may include a timing generator 231 and an analog/digital (A/D) converter 232. The timing generator 231 generates timing for driving the CCD in the image pickup device 220. The A/D converter 232 converts an analog signal input from the CCD into a digital signal, and can output the thus-obtained digital signal to the image processing device 240.

The image processing device 240 (e.g., a digital signal processor (DSP)) can receive the digital signal representing the picked-up image from the AFE unit 230, subject the signal to a two-dimensional convolution process, and output the result to the camera signal processor 250. The image processing device 240 is operable to perform a filtering process of the optical transfer function (OTF) on the basis of exposure information obtained from the controller 290. The exposure information may include, without limitation, aperture information.

The image processing device 240 comprise a function of enhancing the response of an optical transfer function with respect to multiple images picked up by the image pickup device 220 and performing a filtering process (such as a convolution filtering process) to eliminate a change in the optical transfer function in accordance with an object distance. While being dependent on a plurality of object distances, the image processing device can allow for a large depth of field. The image processing device 240 generates an image signal with a smaller blur than that of a signal of a blurred object image output from the image pickup device 220.

In addition, the image processing device 240 is operable to perform noise-reduction filtering at a first step. The image processing device 240 can also perform a filtering process of the optical transfer function (OTF) and improving the contrast.

The camera signal processor (DSP) 250 is operable to perform, without limitation, processes including color interpolation, white balancing, YCbCr conversion, compression, filing, etc., stores data in the memory 260, and displays images on the image monitoring device 270.

The controller 290 is operable to perform exposure control, receive operation inputs from the operating unit 280 and the like, and determine the overall operation of the system on the basis of the received operation inputs. Thus, the controller 190 can control the AFE unit 230, the image processing device 240, DSP 250, the aperture stop 213, and the like, so as to perform arbitration control of the overall system.

The lens frame includes the first holder that holds the lenses in the optical system 210 and the second holder that holds the image pickup device 220. The first holder and the second holder are fixed to each other.

The thermal expansion/contraction amount of the distance from an image-pickup-element-side face of the final lens (i.e., the fourth lens in FIG. 6) of the optical system 210, which is located closest to the image pickup device 220, to the image pickup device 220 can be adjusted by two methods. One method is setting the linear expansion coefficient of the second holder and the other method is changing the fixed positions of the first holder and the second holder.

The both methods will be described below with the description of the detailed configuration of the lens frame.

Figure 10:
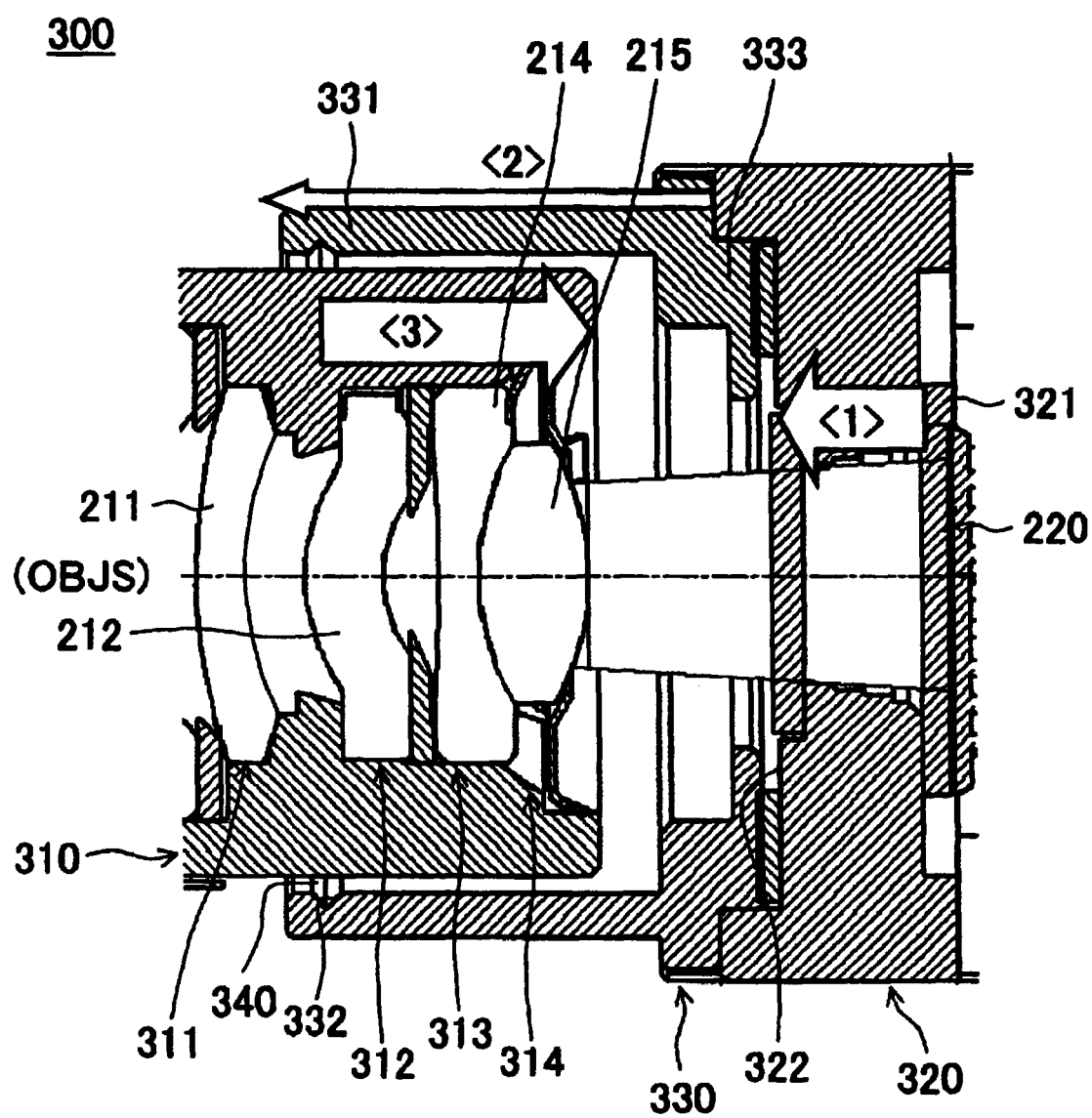
FIG. 10 illustrates an exemplary lens frame according to one embodiment of the invention.
Figure 11:
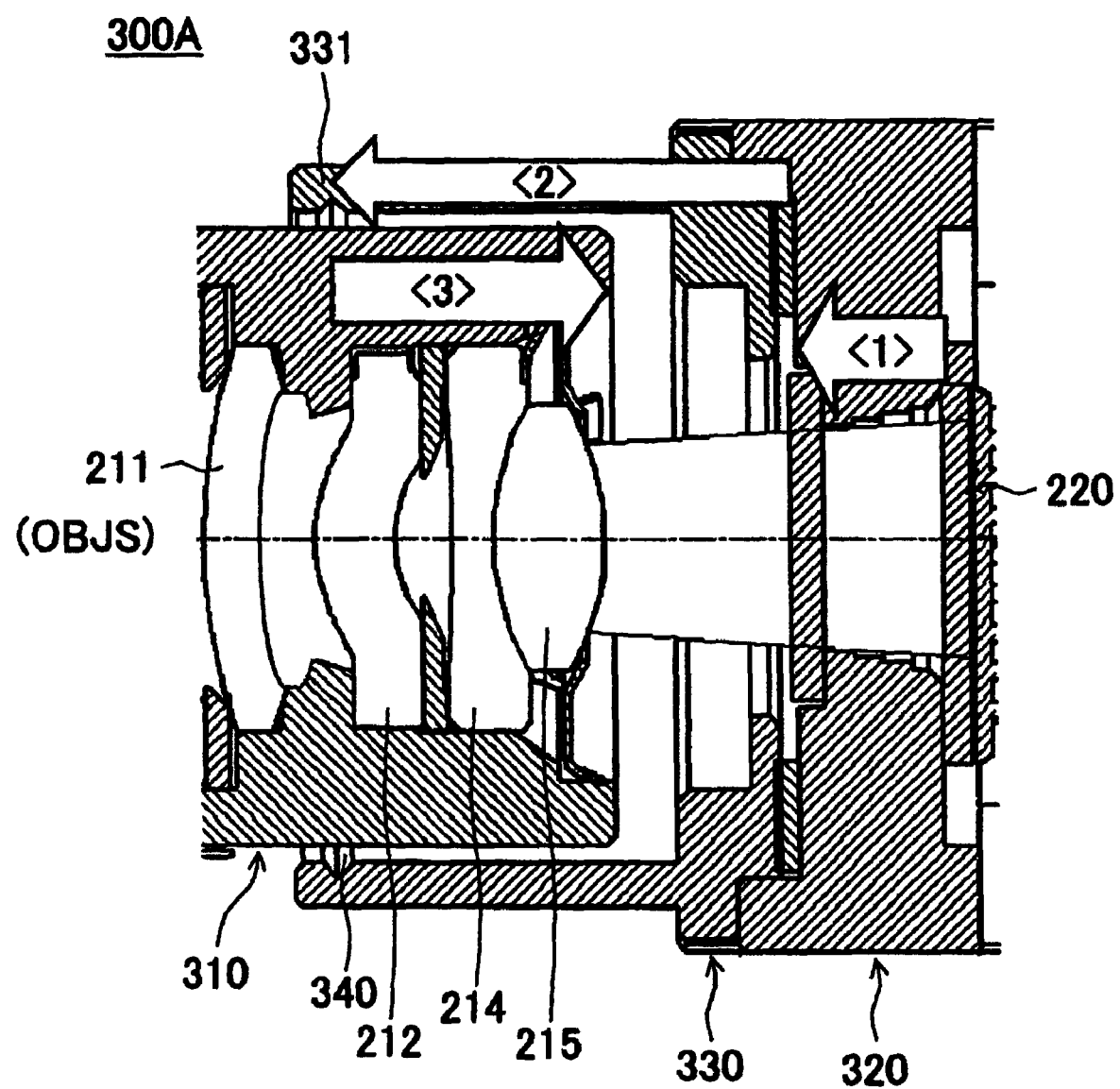
FIG. 11 illustrates an exemplary lens frame according to one embodiment of the invention.

FIGS. 10 and 11 illustrate exemplary lens frames according to one embodiment of the invention. As shown in FIGS. 10 and 11, the lens frames 300 and 300A include the first holder 310 and the second holder 320 as separate components. The first holder 310 and the second holder 320 are fixed by means of an intermediate member 330. The first holder 310 and the second holder 320 may have different linear expansion coefficients. Specifically, the linear expansion coefficient of the first holder 310 is greater than the linear expansion coefficient of the second holder 320. With controlling the coefficients of the holders, deviation in the back-focus position can be controlled, thereby allowing for sufficient performance that can satisfy various needs from a low-temperature environment to a high-temperature environment. Moreover, a temperature change affecting the depth of field in a depth expansion optical system can be alleviated.

The first holder supports a plurality of lenses, and may be located at a first distance on an optical axis (z in FIG. 6) of the optical system 210. The first holder 310 may be cylindrical and includes a first holding section 311 that holds the first lens 211, a second holding section 312 that holds the second lens 212, a third holding section 313 that holds the third lens 214, and a fourth holding section 314 that holds the fourth lens 215.

The outer side of the first holder 310 is fixed to one end of the intermediate member 330 at the object side of the first holder 310 relative to the middle thereof in the axial direction by using, without limitation, an adhesive 340. The first holder 310 is composed of plastic without limitation.

The second holder 320 supports the image pickup device 220, and is located at a second distance on the optical axis (z in FIG. 6). The second holder 320 is a cylinder with an outside diameter larger than that of the first holder 310. The central portion of the second holder 320 has an opening extending in the axial direction. The second holder 320 has the image pickup device 220 fixed to the bottom face 321 (i.e., a first face) thereof.

The other end 331 of the intermediate member 330 is fixed to the top face 322 (i.e., an object-side face) of the second holder 320 by using, for example, an adhesive. The second holder 320 is composed of plastic without limitation.

The intermediate member 330 is a cylinder comprising an inside diameter larger than the outside diameter of the first holder 310. The one end 331 of the intermediate member 330 has an adhesive receiver 332 extending circumferentially along the inner surface thereof and used for receiving an adhesive 340 injected when fixing the first holder 310.

The other end of the intermediate member 330 is provided with a flange 333 that extends inward. The outer face (i.e., the bottom face) of this flange 333 is fixed in contact with the top face 322 of the second holder 320.

The intermediate member 330 is composed of a metallic material comprising a low linear expansion coefficient, such as aluminum.

Although the second holder 320 and the first holder 310 in the lens frame 300 are fixed to each other in this manner so that the optical system is in a fixed focus state, back-focus positional shift caused by a temperature change can be alleviated without requiring a driving mechanism by varying the linear expansion coefficients of the material of the first holder 310 and the material of the second holder 320.

By setting the linear expansion coefficient of the intermediate member 330 lower than the linear expansion coefficients of the first holder 310 and the second holder 320, the amount of relative positional shift among the lenses in the lens frame 300 can be minimized in the optical system in which, for example, back-focus positional shift of the lens unit due to the temperature is small and the back-focus is sufficiently long.

Thus, the first holder 310 at a first distance and the second holder 320 at a second distance are at predetermined locations based on the power of the plastic lenses.

Furthermore, when the total power of the plastic lens included in the optical system 210 is positive, the distance between the image-pickup-element-side face of the fourth lens 215, which is the final lens, and the image pickup device 220 becomes longer at high temperature and shorter at low temperature, relative to the normal temperature.

The first holder 310 is fixed to the intermediate member 330 at the object side of the first holder 310 relative to the middle thereof in the axial direction.

Accordingly, in an embodiment, fluctuation of the plastic lens due to the temperature change can be minimized by reducing the power of the plastic lens at the time of designing the lens. In addition, by forming the first holder 310 and the second holder 320 as separate components and giving the two holders different linear expansion coefficients, performance deterioration occurring from back-focus shift due to the temperature change can be minimized.

The following description relates to temperature-aware design of the second holder 320 and the first holder 310 composed of different materials.

Supposing that the lens frame is not designed in view of the temperature, if the frame is composed of plastic, the back-focus position will undesirably extend at high temperature.

Furthermore, because the refractive index of the lenses decreases at high temperature, if the plastic lens, which is especially influential, has negative power, the lens power can decrease, causing the back-focus position to shift towards the shorter side. In other words, the lens frame and the lenses change in temperature towards an unfavorable state.

Therefore, if the second holder 320 is composed of plastic, the plastic lens of the lens unit may have positive power.

If the plastic lens has positive power in this manner, the lens power decreases at high temperature, causing the back-focus position to shift towards the longer side. Therefore, the distance from the image-pickup-element-side face of the final lens to the image-pickup-element face may increase at high temperature due to the expansion of the lens frame.

How the back-focus positional shift is adjusted if the plastic lens has positive power, is described below according to an embodiment of the invention.

The example shown in FIG. 10 shows how fluctuation of the lens frame is alleviated when the plastic lens has negative power.

Supposing that a temperature compensation barrel is at high temperature, an arrow <1> denotes the direction and the magnitude when the second holder 320 expands on the basis of the image-pickup-element face, an arrow <2> denotes the direction and the magnitude when the intermediate member 330 expands on the basis of the reception of the second holder 320, and an arrow <3> denotes the direction and the magnitude when the intermediate member 330 expands on the basis of the attached position.

Since the second holder 320 is composed of plastic, the back-focus extends toward the object. Due to being composed of aluminum, which has a linear expansion coefficient lower than that of plastic, the intermediate member 330 has an expansion rate lower than the expansion rate of the first and second holders 310, 320. The first holder 310 composed of plastic expands toward the image pickup device 220 on the basis of the attached position. Thus, the plastic first holder 310 expands toward the image pickup device 220.

Accordingly, with the combination of the lens frame components composed of materials having different linear expansion coefficients, the distance from the final lens face to the image-pickup-element face can be shortened by the lens frame even at high temperature, thereby reducing back-focus shift caused by the temperature.

In contrast, if the plastic lens has positive power, the lens power decreases at high temperature, causing the back-focus position to shift towards the longer side. Therefore, the distance from the image-pickup-element-side face of the final lens, which is the fourth lens in this case, to the image-pickup-element face may increase at high temperature due to the expansion of the lens frame. The example shown in FIG. 11 shows how fluctuation of the lens frame is alleviated when the plastic lens has positive power.

Supposing that a temperature compensation barrel is at high temperature, arrows <1>, <2> and <3> denotes the same in FIG. 10.

Since the holder 320 is made of plastic, the back-focus expands towards the object side on the basis of the image pickup device 220 face (see <1>).

In the example shown in FIG. 11, the linear expansion of the first holder is adjusted in the direction of the arrow <2> so as to link with back-focus shift, thereby preventing back-focus shift even at high temperature. For example, since the amount of back-focus shift is reduced if the power of the plastic lens is positive and low, metal with a low linear expansion coefficient, such as aluminum, may be used.

In contrast, since the back-focus position is significantly extended at high temperature if the plastic lens has dominantly high positive power, the second holder may be composed of plastic with a high linear expansion coefficient.

Accordingly, with the combination of the lens frame components composed of materials having different linear expansion coefficients, the distance, which expands at high temperature, from the image-pickup-element-side face of the final lens to the image-pickup-element face 220 can be adjusted appropriately, thereby reducing back-focus shift caused by the temperature.

The plastic used for forming the first holder is, without limitation, PCGF20 (having a linear expansion coefficient of 0.000065). Although the first holder comprise aluminum or plastic, the linear expansion coefficient thereof may be adjusted by combining two materials, such as, without limitation, glass in plastic.

An adhesive that can be cured by irradiating it with ultraviolet light may be used. With the use of such an adhesive, the first holder (barrel) can be fixed after freely adjusting it (for example, after adjusting it also in a direction not parallel to the optical axis). This fixation may be implemented by fitting a projection provided in one of the first holder and the intermediate member into a recess provided in the other one of the two. With such a mechanical fixation method, the effect of age deterioration of an adhesive can be minimized.

Figure 12:
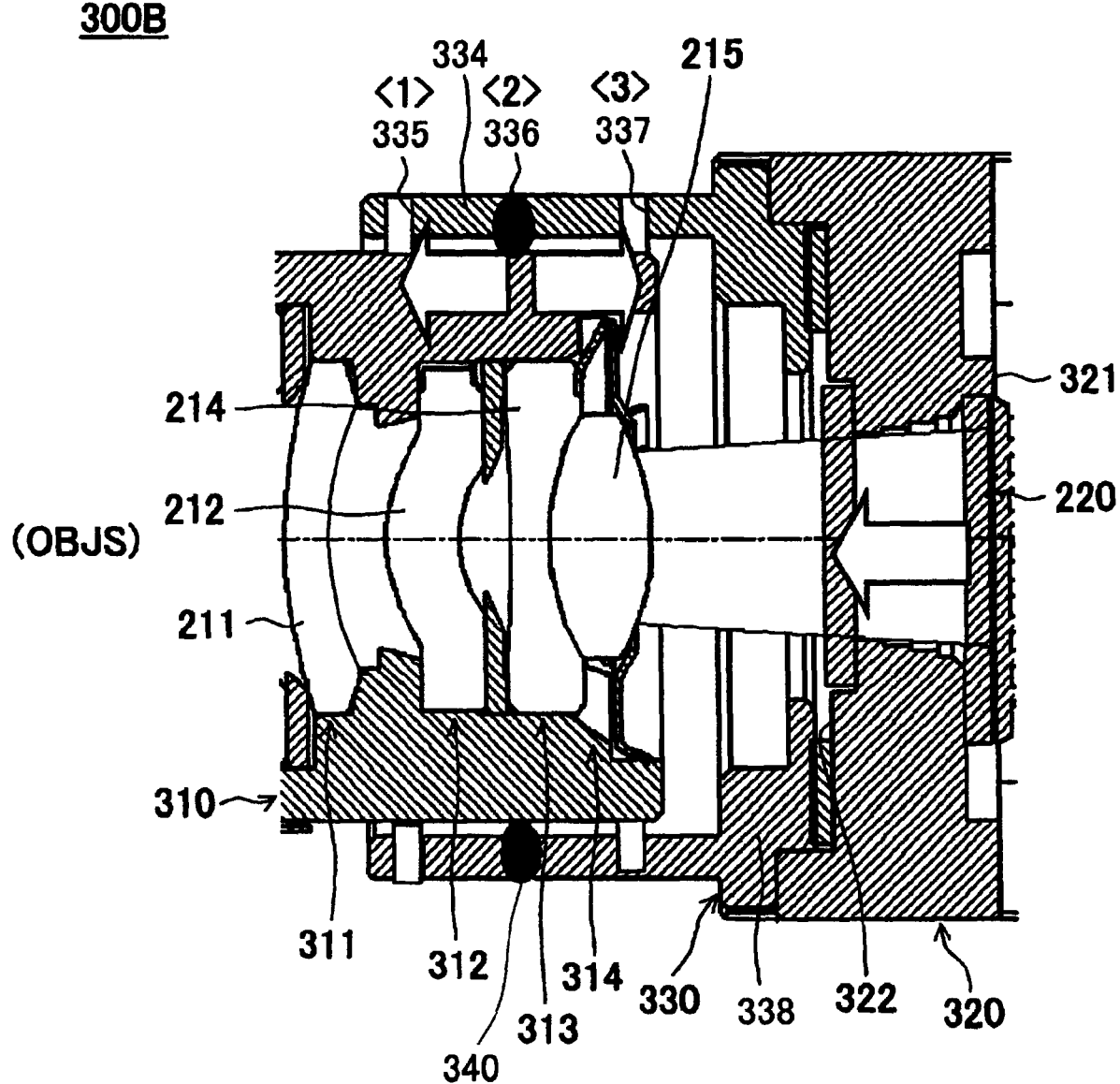
FIG. 12 illustrates a method for fixing the lens frame according to one embodiment of the invention.
Figure 13:
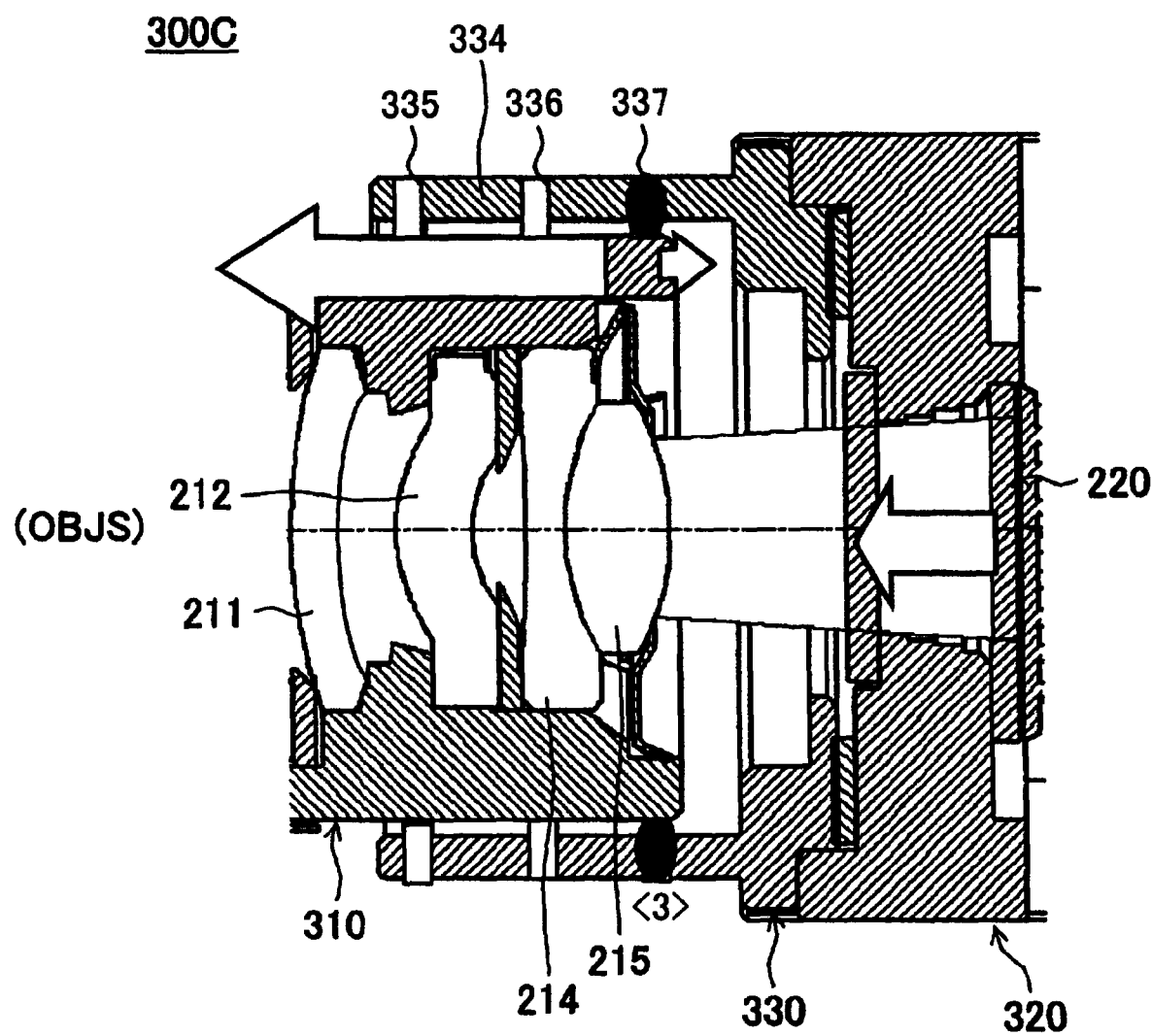
FIG. 13 illustrates a method for fixing the lens frame according to one embodiment of the invention.
Figure 14:
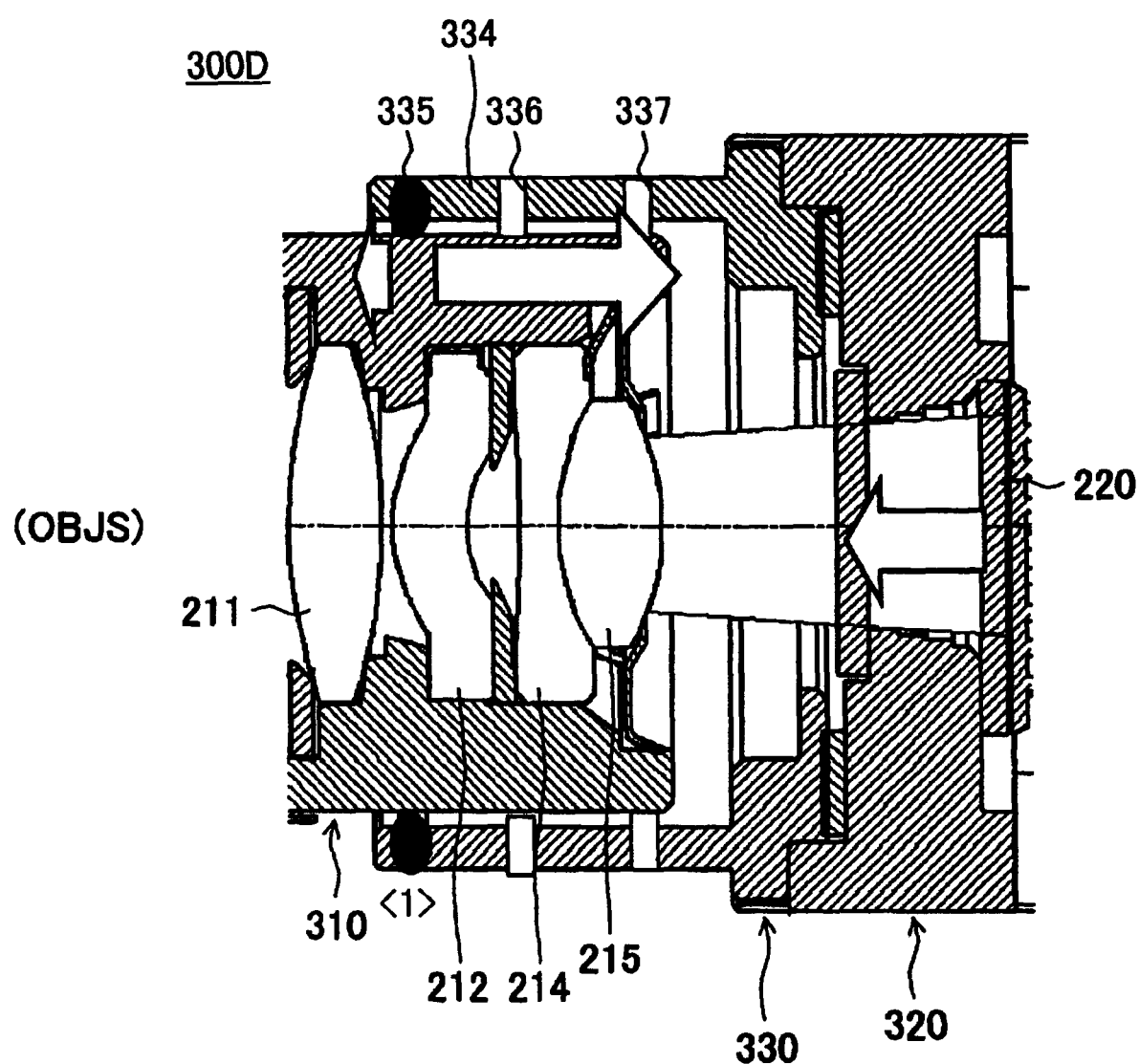
FIG. 14 illustrates a method for fixing the lens frame according to one embodiment of the invention.

FIGS. 12 to 14 illustrate methods for fixing the lens frame according to one embodiment of the invention. In the embodiment, the 300B, 300C and 300D in FIGS. 12 to 14 are used for a frame structure. Lens supporting unit 310 and image pick up element supporting unit 320 are supported and fixed by an intermediate portion 330. The locations of lens supporting unit 310 and image pick up element supporting unit 320 are adjustable with using the intermediate portion 330. The adjustment of these locations can maintain the characteristics of the image pickup device 220 even though the temperature is varied from low temperature to high temperature for a wide variety of needs. Furthermore, in WFCO (Wavefront Coding Optical System), the effect of temperature change on the depth of field will be alleviated.

In the present embodiment, the distance from an image-pickup-element-side face 7 of the final lens (i.e., the fourth lens 215 in FIG. 6), which is located closest to the image pickup device 220 of the optical system 210, to the image pickup device 220 is change by temperature change. An amount of the change is adjustable by changing the fixed position of the first holder 310 and the second holder 320.

The first holder 310 may have a cylindrical shape and includes a first holding section 311 that holds the first lens 211, a second holding section 312 that holds the second lens 212, a third holding section 313 that holds the third lens 214, and a fourth holding section 314 that holds the fourth lens 215. The first holder 310 may be composed of plastic without limitation.

The second holder 320 may have a cylindrical shape with an outside diameter larger than that of the first holder 310. The central portion of the second holder 320 has an opening extending in the axial direction. The second holder 320 has the image pickup device 220 fixed to the bottom face 321 (i.e., a first face) thereof.

The one end of the intermediate member 330 is fixed to the top face 322 (i.e., an object-side face) of the second holder 320 by using, without limitation, an adhesive. The second holder 320 is composed of plastic without limitation.

The intermediate member 330 is a cylinder with an outside diameter larger than that of the first holder 310. A sidewall 334 of the intermediate member 330 is provided with a plurality (i.e. three in case of the present embodiment) of fixation sections 335 to 337 each formed of through holes that are arranged at predetermined intervals in the axial direction. Specifically, the fixation sections 335 to 337 are arranged at predetermined intervals in the circumferential direction.

The other end of the intermediate member 330 is provided with a flange 338 that extends inward. The outer face (i.e., the bottom face) of this flange 338 is fixed in contact with the top face 322 of the second holder 320.

The intermediate member 330 comprises, without limitation, a plastic or a metallic material having a low linear expansion coefficient, such as aluminum.

The second holder 320 and the first holder 310 in the lens frame 300B, 300C and 300D are fixed to each other so that the optical system 210 is in a fixed focus state, and thereby alleviating back-focus positional shift caused by a temperature change without requiring a driving mechanism.

Without changing the back-focus position at normal temperature, the lens unit can be made to cover from high temperature to low temperature by adjusting the fixed positions of the first holder 310 and the second holder 320.

In the image pickup apparatus 300B and 300C shown in FIGS. 12 to 14, when the total power of the plastic lens included in the optical system 210 is positive, the distance between the image-pickup-element-side face of the fourth lens 215, which is the final lens, and the image pickup device 220 becomes longer at high temperature and shorter at low temperature, relative to the normal temperature.

Accordingly, in this embodiment, fluctuation of the plastic lens due to the temperature change can be minimized by reducing the power of the plastic lens at the time of designing the lens. In addition, by forming the first holder 310 and the second holder 320 as separate components and making the fixed positions of the first holder 310 and the second holder 320 adjustable with using the intermediate member 330, performance deterioration occurring from back-focus shift due to the temperature change can be minimized.

In a mechanism of the lens frames 300B, 300C and 300D comprising three adjustable fixed positions shown in FIGS. 12 to 14, it is supposed that the first holder 310 and the second holder 320 have similar linear expansion coefficients.

When the plastic lens included in the optical system has low positive power, the distance from the image-pickup-element-side face (i.e., the final lens face) to the image pickup device 220, for example, increases at high temperature in accordance with the linear expansion coefficients of the materials used for the holders. However, the amount of back-focus shift is small when the plastic lens in the lens unit has low power.

When a fixed position like <1> (fixation section 335) is near the top lens face as shown in FIG. 14, the back-focus shift can be cancelled out.

In contrast, when the total power of the plastic lens is positive and high, the back-focus is extended at high temperature in the lens frame, resulting in lower positive power for the lens and longer back-focus. In that case, the fixed position may be shifted to position <3>, as shown in FIG. 13. By shifting the fixed position to position <3>, the distance from the final lens face to the image pickup device 220 is not cancelled out.

The following description relates to temperature-aware design with adjustable fixed positions.

In the mechanism of the lens frame comprising three adjustable fixed positions, as shown in FIG. 12 to 14, the lenses are designed such that satisfactory performance can be maintained at position <2> within a temperature range from normal temperature to a certain temperature. The distance between the fourth lens face, which is the final lens face, and the image-pickup-element face is appropriately shortened on the basis of the fixed position even at high temperature. However, when the total power of the plastic lens is positive and high, the back-focus position is extended at high temperature with respect to the lens frame, and the positive power of the lens becomes lower and the back-focus becomes longer. In that case, as shown in FIG. 13, the fixed position may be set at position <3>. By setting the fixed position at position <3>, the distance from the final lens face to the image pickup device 220 is not cancelled out.

If the total power of the plastic lens is negative and high, the back-focus is extended at high temperature with respect to the lens frame, and the negative power of the lens becomes lower and the back-focus becomes shorter. In that case, the fixed position may be at position <1> (fixation section 335), as shown in FIG. 14. By shifting the fixed position to position <1>, the distance from the final lens face of the fourth lens 215 to the image pickup device 220 is cancelled out and will be shorter.

Referring to FIG. 12, the plastic used for forming the first holder 310 is, without limitation, PCGF20 (having a linear expansion coefficient of 0.000065). The first holder 310 may be composed of plastic mixed with glass, thereby controlling the linear expansion coefficient thereof.

An adhesive that can be cured by irradiating it with ultraviolet light may be used in the present embodiment. A fixation method by screwing can also be used.

With the use of such an adhesive, the first holder (barrel) can be fixed after freely adjusting it (for example, after adjusting it also in a direction not parallel to the optical axis). With such a mechanical fixation method using screws, the effect of age deterioration of an adhesive can be minimized.

Figure 15:
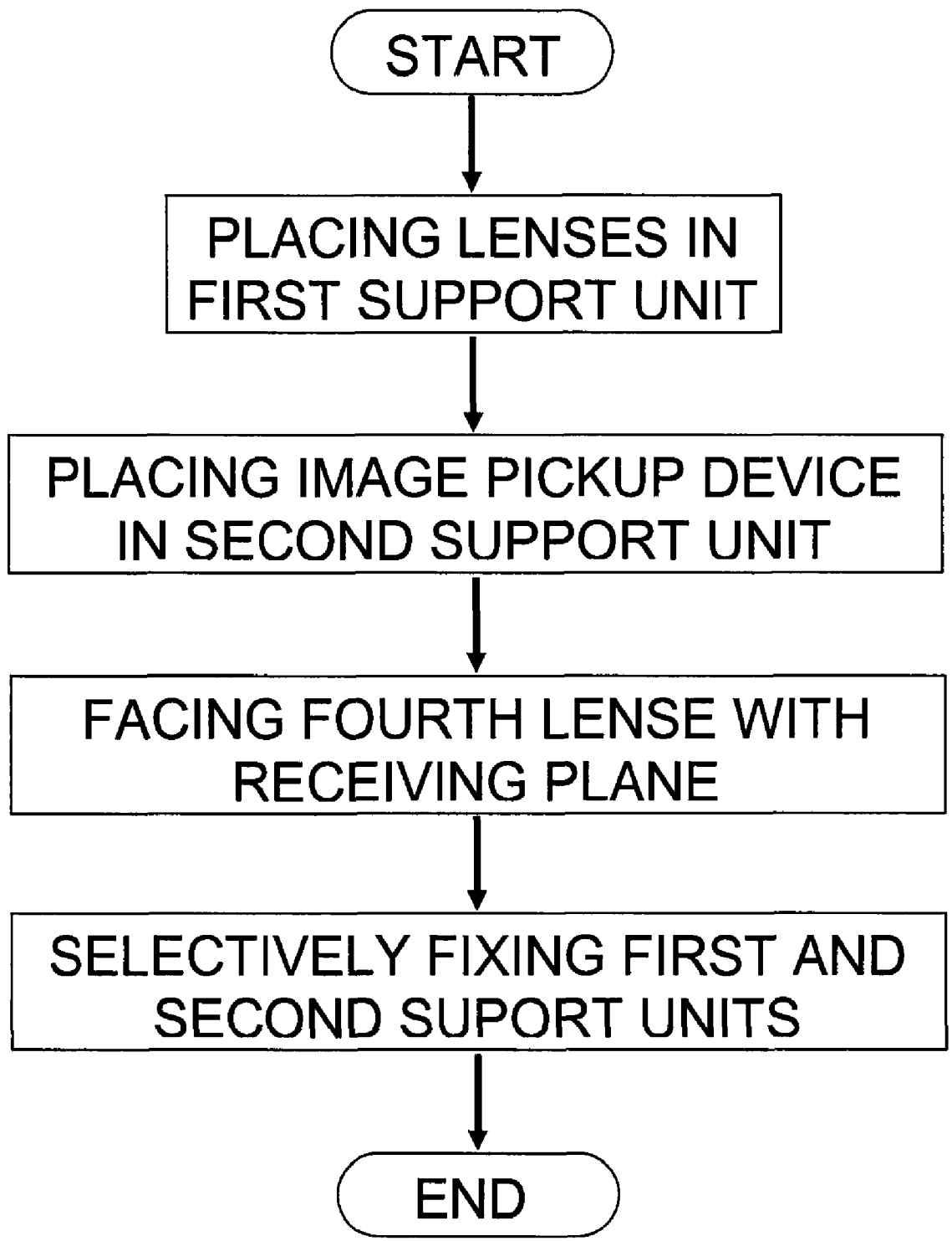
FIG. 15 is a flow chart showing the procedure of producing an image pickup apparatus according to one embodiment of the invention.

The lenses and the image pickup device 220 having the above-described configuration can be, without limitation, assembled together in accordance with a procedure shown in FIG. 15.

In step ST301, the lenses in the optical system including glass and plastic lenses are set in the first holder 310. The first lens 211, second lens 212, third lens 214, and fourth lens 215 are arranged in the first holder 310 in that order from the object side.

In step ST302, the image pickup device 220 is set in the second holder 320. The order of ST301 and ST302 can be inverted.

In step ST303, the image-pickup-element-side face of the fourth lens 215, which is the final lens located closest to the image pickup device 220, and a light-receiving face of the image pickup device 220 are located facing each other.

The process performed in step ST303 is associated with an embodiment shown in FIGS. 12 to 14.

In step ST304, the first holder 310 and the second holder 320 are selectively fixed, by using the intermediate member 330, to positions where they can relatively absorb back-focus positional shift occurring in response to a temperature change.

Alternatively, as a process associated with an embodiment shown in FIGS. 10 and 11, the fixed positions of the first holder 310 and second holder 320 or the materials (linear expansion coefficients) of the first holder 310 and the second holder 320 may be selected so that they are fixed to positions where they can relatively absorb back-focus positional shift occurring in response to a temperature change.

When the total power of the plastic lens included in the optical system is positive in the step ST304, the first holder 310 and the second holder 320 are selectively fixed so that the distance between the image-pickup-element-side face of the fourth lens 215, which is the final lens located closest to the image pickup device 220, and the image pickup device 220 becomes longer at high temperature and shorter at low temperature, relative to the normal temperature.

In the optical system described above, the amount by which the distance between the image-pickup-element-side face of the final lens located closest to the image pickup device 220 and the image pickup device 220 increases or decreases due to heat accords with the amount by which back-focus is shifted in response to a temperature change in the optical system.

The following relates to practical examples 1 and 2 of specific numerical values in the optical system (i.e. image pickup lens unit) 210A. In the following examples 1 and 2, the first lens 211, third lens 214, and fourth lens 215 are composed of glass, whereas the second lens 212 is composed of plastic. The power of the plastic lens is set lower than the power of the glass lenses, and is also set lower than the power of the optical system 210A.

In each example, the lenses constituting the lens groups of an image pickup lens unit 210A and the cover glass constituting the image pickup device 220 are given numbers, as shown in FIG. 6.

Example 1

Tables 1 and 2 shows numerical values for example 1. These numerical values correspond to the image pickup lens unit 210A shown in FIG. 6. The first-lens focal length is −4.73, the second-lens focal length is 5.47, and the third-and-fourth-compound-lens focal length is 4.20. Table 1 shows the radius of curvature (R: mm), the distance (D: mm), the refractive index (N), and the dispersion value (ν) for each of a lens stop, the lenses, and the cover glass that correspond to the face numbers of the image pickup lenses in the example 1.

TABLE 2

|   | Radius of Curvature | | Distance | Refractive Index | | Dispersion Value |
|---|---|---|---|---|---|---|
|   |   |   | Object | 125.0 |   |   |
| 1 | R1 | 3.6 | D1 | 0.9 | N1 1.608 v1 | 33.7 |
| 2 | R2 | 1.444 | D2 | 0.382 |   |   |
| 3 | R3 | 1.82 | D3 | 1.3423 | N2 1.607 v2 | 26.9 |
| 4 | R4 | 2.933 | D4 | 0.18 |   |   |
|   | Aperture width | | | 0.227 |   |   |
| 5 | R5 | −10.6 | D5 | 0.7 | N3 1.706 v3 | 26.9 |
| 6 | R6 | 3.13 | D6 | 1.6 | N4 1.773 v4 | 49.6 |
| 7 | R7 | −2.91 | D7 | 4.57 |   |   |
| 8 | R8 | 0.0 | D8 | 0.5 | Glass |   |
| 9 | R9 | 0.0 |   |   |   |   |

Table 2 shows aspherical coefficients of predetermined faces of the first lens 211, the second lens 212, the third lens 214 and the fourth lens 215 which include aspheric surfaces. In Table 2, k denotes a conic constant, and A, B, C, and D respectively denote fourth-order, sixth-order, eighth-order, and tenth-order aspherical coefficients. Moreover, α and β denote phase front coefficients, and x and y denote directions shown in FIG. 6. Specifically, the face 4 has α of −0.00165 and β of 0.0217.

Aspheric Surface Equation;

$$Z = \frac{ch^2}{1 + \sqrt{1 - (1+k)c^2h^2}} + Ah^4 + Bh^6 + Ch^8 + Dh^{10} + \alpha(x^3 + y^3) + \beta(x^5 + y^5)$$

TABLE 2

|   | K | A | B | C | D |
|---|---|---|---|---|---|
| 1 |   |   |   |   |   |
| 2 |   |   |   |   |   |
| 3 | 0.5226 | −0.0005 |   |   |   |
| 4 | 5.828 | −0.0071 | −0.0043 |   |   |
| 5 |   |   |   |   |   |
| 6 |   |   |   |   |   |
| 7 |   |   |   |   |   |

Example 2

Figure 16:
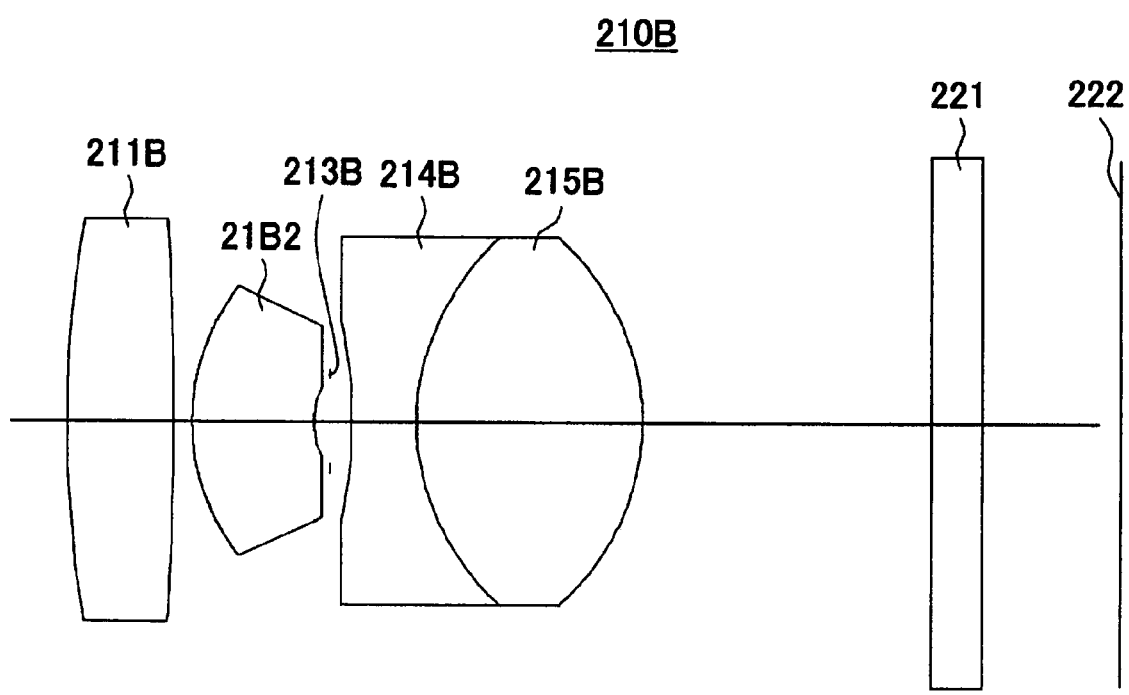
FIG. 16 illustrates a image pickup lens unit according to one embodiment of the invention.

Table 3 and 4 shows numerical values for example 2. These numerical values correspond to the image pickup lens unit 210B shown in FIG. 16. The first-lens focal length is 17.0, the second-lens focal length is −22.0, and the third-and-fourth-compound-lens focal length is 4.73. Table 3 shows the radius of curvature (R: mm), the distance (D: mm), the refractive index (N), and the dispersion value (v) for each of a lens stop, the lenses, and the cover glass that correspond to the face numbers of the image pickup lenses in the example 2.

TABLE 3

|   | Radius of Curvature | | Distance | | Refractive Index | | Dispersion Value |
|---|---|---|---|---|---|---|---|
|   |   |   | Object | 125.0 |   |   |   |
| 1 | R1 | 18.22 | D1 | 1.16 | N1 | 1.805 v1 | 25.4 |
| 2 | R2 | −52.04 | D2 | 0.2 |   |   | 26.9 |
| 3 | R3 | 3.235 | D3 | 1.325 | N2 | 1.607 v2 |   |
| 4 | R4 | 2.2 | D4 | 0.18 |   |   |   |
|   | Aperture Width | | | 0.243 |   |   |   |
| 5 | R5 | −6.6 | D5 | 0.7 | N3 | 1.752 v3 | 25.0 |
| 6 | R6 | 3.53 | D6 | 2.464 | N4 | 1.883 v4 | 40.8 |
| 7 | R7 | −3.53 | D7 | 3.112 |   |   |   |
| 8 | R8 | 0.0 | D8 | 0.5 | Glass |   |   |
| 9 | R9 | 0.0 |   |   |   |   |   |

Table 4 shows aspherical coefficients of predetermined faces of the first lens 211B, the second lens 212B, the third lens 214B and the fourth lens 215B which include aspheric surfaces. In Table 4, k denotes a conic constant, and A, B, C, and D respectively denote fourth-order, sixth-order, eighth-order, and tenth-order aspherical coefficients. Moreover, α and β denote phase front coefficients, and x and y denote directions shown in FIG. 16. Specifically, the face 4 has α of −0.00165 and β of 0.0217.

Aspheric Surface Equation;

$$Z = \frac{ch^2}{1 + \sqrt{1 - (1+k)c^2h^2}} + Ah^4 + Bh^6 + Ch^8 + Dh^{10} + \alpha(x^3 + y^3) + \beta(x^5 + y^5)$$

TABLE 4

|   | k | A | B | C | D |
|---|---|---|---|---|---|
| 1 |   |   |   |   |   |
| 2 |   |   |   |   |   |
| 3 | 0.1357 |   |   |   |   |
| 4 | 0.9822 |   |   |   |   |
| 5 |   |   |   |   |   |
| 6 |   |   |   |   |   |
| 7 |   |   |   |   |   |

Tables 5 and 6 show an example of refractive-index fluctuation occurring due to a linear expansion coefficient.

TABLE 5

|   | Refractive Index at 25° C. | Linear Expansion Coefficient |
|---|---|---|
| PLASTIC | 1.5304 | 0.00007 |
| GLASS | 1.8042 | 0.0000063 |

TABLE 6

| | Temperature (° C.) | | | | | |
|---|---|---|---|---|---|---|
| | −30 | 0 | 20 | 25 | 45 | 70 |
| | Temperature Change on the basis of 25° C. | | | | | |
| | −55 | −25 | −5 | 0 | 20 | 45 |
| Plastic | 1.5365261 | 1.533185 | 1.530957 | 1.5304 | 1.528172 | 1.525388 |
| GLASS | 1.805036 | 1.80458 | 1.804276 | 1.8042 | 1.803896 | 1.803516 |

The refractive-index fluctuation of plastic is greater than that of glass with the temperature range in Table 6. When the second lens 212B is composed of plastic, since the second lens power in the example 2 is reduced, back-focus positional shift due to the temperature change can still be alleviated even if refractive-index fluctuation occurs due to the temperature change.

Accordingly, in the image pickup lens unit shown in examples 1 and 2, high image-forming performance can be achieved.

In the image pickup lens unit, the plastic lens and the glass lenses are included, the total power of the plastic lens is positive, and the fixed positions of the first and second holders or the linear expansion coefficients of the materials used for forming the first holder and the second holder are adjusted in the examples 3 to 5 as follows.

The lenses 211, 212, 214 and 215 constituting the lens groups of the image pickup lens unit 210A and the cover glass 221 constituting the image pickup device 220 in example 3 are given the face numbers, as shown in FIG. 6.

Figure 17:
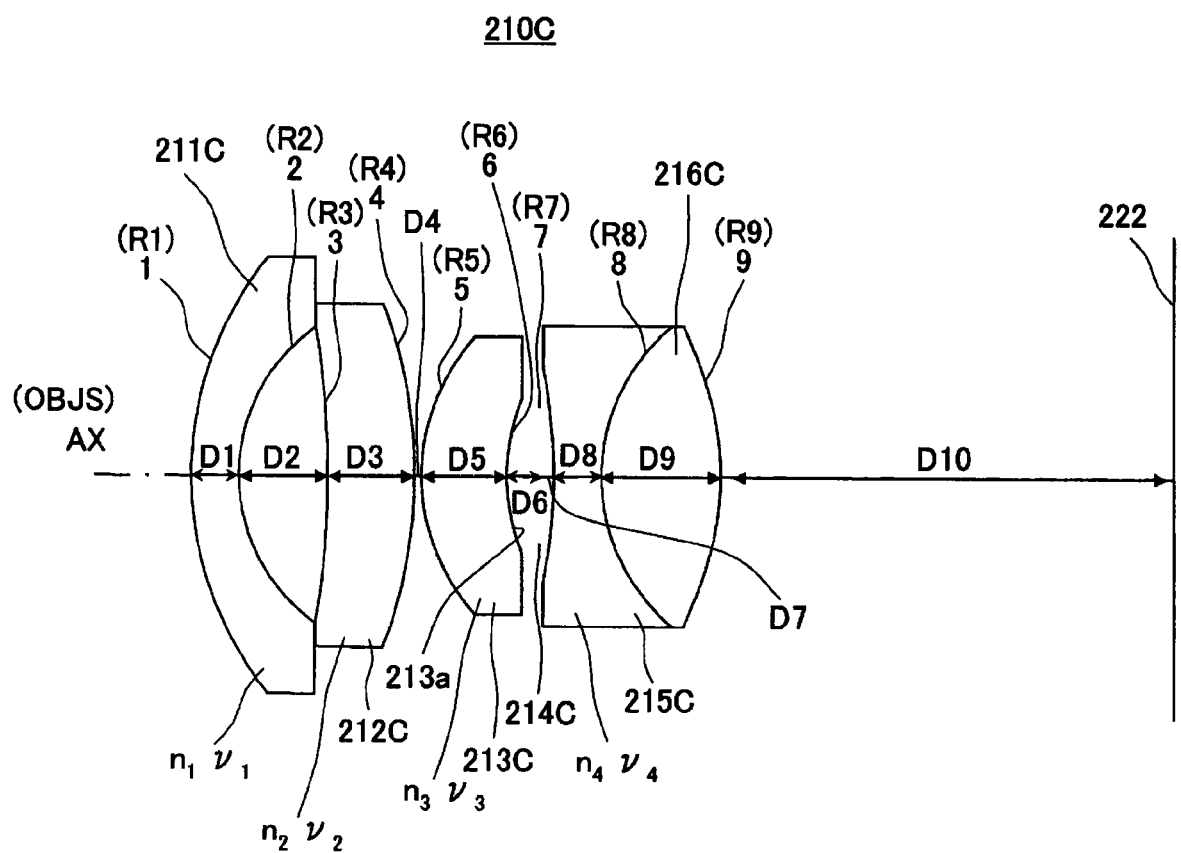
FIG. 17 illustrates a image pickup lens unit according to one embodiment of the invention.

The optical system (i.e. image pickup lens unit) 210C shown in FIG. 17 includes first to fifth lenses and a lens stop in examples 4 and 5. The optical system 210C shown in FIG. 17 includes the first lens 211C, the second lens 212C, the third lens 213C, the lens stop 214C, the fourth lens 215C, and the fifth lens 216C. Specifically, the first lens 211C, the second lens 212C, the third lens 213C, the lens stop 214C, the fourth lens 215C, and the fifth lens 216C in the optical system 210C are arranged in that order from the object side.

The fourth lens 215C and the fifth lens 216C in the optical system 210C are joined. That is, the optical system 210 may include a compound lens. The first lens 211C, the second lens 212C, the fourth lens 215C and the fifth lens 216C are composed of glass and the third lens 213C is composed of plastic.

In the optical system 210C, the light wavefront modulation element is provided separately from the lenses. However, the third lens 213C, for example, may additionally have a light wavefront modulating function.

A central region 213a, centered on the optical axis, of a face of the third lens closer to the image pickup face has a concave shape with predetermined curvature. With this concave shape, the third lens 213C functions as a light wavefront modulation element.

In the optical system 210C, an object-side face of the first lens 211C is set to have a center radius of curvature of R1, and an image-side face of the first lens 211C is set to have a center radius of curvature of R2. An object-side face of the second lens 212C is set to have a center radius of curvature of R3, and an image-side face of the second lens 212C is set to have a center radius of curvature of R4. An object-side face of the third lens 213C is set to have a center radius of curvature of R5, and an image-side face of the third lens 213C is set to have a center radius of curvature of R6. An object-side face of the fourth lens 215C is set to have a center radius of curvature of R7, and an image-side face of the fourth lens 215C is set to have a center radius of curvature of R8. An object-side face the fifth lens 216C is set to have a center radius of curvature of R9.

The first lens 211C is set to have a refractive index of $\eta_1$ and a dispersion value of $v_1$, the second lens 212C is set to have a refractive index of $\eta_2$ and a dispersion value of $v_2$, third lens 213C is set to have a refractive index of $\eta_3$ and a dispersion value of $v_3$, the fourth lens 215C is set to have a refractive index of $\eta_4$ and a dispersion value of $v_4$, and the fifth lens 216C is set to have a refractive index of $\eta_5$ and a dispersion value of $v_5$.

Example 3

Tables 7 and 8 shows numerical values for example 3. These numerical values correspond to the image pickup lens unit 210A shown in FIG. 6. The first-lens focal length is −4.73, the second-lens focal length is 5.47 which is a plastic lens, and the third-and-fourth-compound-lens focal length is 4.19. Table 7 shows the radius of curvature (R: mm), the distance (D: mm), the refractive index (N), and the dispersion value (v) for each of a lens stop, the lenses, and the cover glass that correspond to the face numbers of the image pickup lenses in the example 3.

TABLE 7

| | Radius of Curvature | | Distance | Refractive Index | | Dispersion Value | |
|---|---|---|---|---|---|---|---|
| | | | Object | 125.0 | | | |
| 1 | R1 | 3.6 | D1 | 0.9 | N1 1.608 | v1 | 33.7 |
| 2 | R2 | 1.444 | D2 | 0.382 | | | |
| 3 | R3 | 1.82 | D3 | 1.3423 | N2 1.607 | v2 | 26.9 |
| 4 | R4 | 2.933 | D4 | 0.18 | | | |
| | Aperture Width | | | 0.227 | | | |
| 5 | R5 | −10.6 | D5 | 0.7 | N3 1.706 | v3 | 26.9 |
| 6 | R6 | 3.13 | D6 | 1.6 | N4 1.773 | v4 | 49.6 |
| 7 | R7 | −2.91 | D7 | 4.57 | | | |
| 8 | R8 | 0.0 | D8 | 0.5 | Glass | | |
| 9 | R9 | 0.0 | | | | | |

Table 8 shows aspherical coefficients of predetermined faces of the first lens 211, the second lens 212, the third lens 214 and the fourth lens 215 which include aspheric surfaces. In Table 8, k denotes a conic constant, and A, B, C, and D respectively denote fourth-order, sixth-order, eighth-order, and tenth-order aspherical coefficients. Moreover, α and β denote phase front coefficients, and x and y denote directions shown in FIG. 16. Specifically, the face 4 has α of −0.00165 and β of 0.0217.

Aspheric Surface Equation;

$$Z = \frac{ch^2}{1 + \sqrt{1 - (1+k)c^2 h^2}} + Ah^4 + Bh^6 + Ch^8 + Dh^{10} + \alpha(x^3 + y^3) + \beta(x^5 + y^5)$$

TABLE 8

| | k | A | B | C | D |
|---|---|---|---|---|---|
| 1 | | | | | |
| 2 | | | | | |
| 3 | 0.5226 | −0.0005 | | | |
| 4 | 5.828 | −0.0071 | −0.0043 | | |
| 5 | | | | | |
| 6 | | | | | |
| 7 | | | | | |

Tables 9 and 10 show an example of refractive-index fluctuation occurring due to a linear expansion coefficient.

TABLE 9

| | Refractive Index at 25° C. | Linear Expansion Coefficient |
|---|---|---|
| PLASTIC | 1.5304 | 0.00007 |
| GLASS | 1.8042 | 0.0000063 |

TABLE 10

| | Temperature (° C.) | | | | | |
|---|---|---|---|---|---|---|
| | −30 | 0 | 20 | 25 | 45 | 70 |
| | | | Temperature Change on the basis of 25° C. | | | |
| | −55 | −25 | −5 | 0 | 20 | 45 |
| Plastic | 1.5365261 | 1.533185 | 1.530957 | 1.5304 | 1.528172 | 1.525388 |
| GLASS | 1.805036 | 1.80458 | 1.804276 | 1.8042 | 1.803896 | 1.803516 |

The refractive-index fluctuation of plastic is greater than that of glass with the temperature range in Table 10. When the second lens 212 is composed of plastic, since the second lens power in the example 3 is reduced, back-focus positional shift due to the temperature change can still be alleviated even if refractive-index fluctuation occurs due to the temperature change.

Example 4

Tables 11 and 12 shows numerical values for example 4. These numerical values correspond to the image pickup lens unit 210C shown in FIG. 17. The first-lens focal length is −9.33, the second-lens focal length is 16.02, the third-lens focal length is 25.15 and the fourth-and-fifth-compound-lens focal length is 6.18. Table 11 shows the radius of curvature (R: mm), the distance (D: mm), the refractive index (N), and the dispersion value (v) for each of a lens stop, the lenses, and the cover glass that correspond to the face numbers of the image pickup lenses in the example 4.

TABLE 11

| | Radius of Curvature | | Distance | | Refractive Index | | Dispersion Value | |
|---|---|---|---|---|---|---|---|---|
| | | | Object | 125.0 | | | | |
| 1 | R1 | 5.04 | D1 | 0.7 | N1 | 1.670 | v1 | 47.1 |
| 2 | R2 | 2.63 | D2 | 1.3 | | | | |
| 3 | R3 | −13.0 | D3 | 1.28 | N2 | 1.883 | v2 | 40.8 |
| 4 | R4 | −7.07 | D4 | 0.1 | | | | |
| 5 | R5 | 2.9 | D5 | 1.26 | N3 | 1.607 | v3 | 27.0 |
| 6 | R6 | 3.0 | D6 | 0.47 | | | | |
| aperture thickness | | 0.05 | | | | | | |
| | | | D7 | 0.16 | | | | |
| 7 | R7 | −8.12 | D8 | 0.7 | N4 | 1.805 | v4 | 25.4 |
| 8 | R8 | 2.8 | D9 | 1.75 | N5 | 1.883 | v5 | 40.8 |
| 9 | R9 | −4.2 | D10 | 6.607 | | | | |
| 10 | R10 | 0.0 | | Image Face | | | | |

Table 12 shows aspherical coefficients of predetermined faces of the first lens 211C, the second lens 212C, the third lens 213C, the fourth lens 215C and the fifth lens 216C which include aspheric surfaces. In Table 12, k denotes a conic constant, and A, B, C, and D respectively denote fourth-order, sixth-order, eighth-order, and tenth-order aspherical coefficients.

Aspheric Surface Equation;

$$Z = \frac{ch^2}{1 + \sqrt{1 - (1+k)c^2h^2}} + Ah^4 + Bh^6 + Ch^8 + Dh^{10}$$

TABLE 12

| | k | A | B | C | D |
|---|---|---|---|---|---|
| 1 | | | | | |
| 2 | | | | | |
| 3 | | | | | |
| 4 | | | | | |
| 5 | −0.377 | 0.00126 | −0.000156 | | |
| 6 | −0.287 | 0.0032 | −0.000545 | | |
| 7 | | | | | |
| 8 | | | | | |
| 9 | −5.515 | −0.0073 | 0.000738 | | |

Example 5

Tables 13 and 14 shows numerical values for example 5. These numerical values correspond to the image pickup lens unit 210C shown in FIG. 17. The first-lens focal length is −8.46, the second-lens focal length is 16.99, the third-lens focal length is 14.81 which is a plastic lens, and the fourth-and-fifth-compound-lens focal length is 6.92. Table 13 shows the radius of curvature (R: mm), the distance (D: mm), the refractive index (N), and the dispersion value (v) for each of a lens stop, the lenses, and the cover glass that correspond to the face numbers of the image pickup lenses in the example 5.

TABLE 13

| | Radius of Curvature | | Distance | | Refractive Index | | Dispersion Value | |
|---|---|---|---|---|---|---|---|---|
| | | | Object | 125.0 | | | | |
| 1 | R1 | 7.0 | D1 | 0.7 | N1 | 1.67 | v1 | 47.1 |
| 2 | R2 | 3.0 | D2 | 1.3 | | | | |
| 3 | R3 | −12.5 | D3 | 1.28 | N2 | 1.883 | v2 | 40.8 |
| 4 | R4 | −7.13 | D4 | 0.1 | | | | |
| 5 | R5 | 2.6 | D5 | 1.26 | N3 | 1.607 | v3 | 27.0 |
| 6 | R6 | 3.0 | D6 | 0.47 | | | | |
| aperture width | | | 0.05 | | | | | |
| | | | D7 | 0.16 | | | | |
| 7 | R7 | −7.11 | D8 | 0.7 | N4 | 1.805 | v4 | 25.4 |
| 8 | R8 | 2.65 | D9 | 1.75 | N3 | 1.883 | v5 | 40.8 |
| 9 | R9 | −4.36 | D10 | 6.607 | | | | |
| 10 | R10 | 0.0 | | Image Face | | | | |

Table 14 shows aspherical coefficients of predetermined faces of the first lens 211C, the second lens 212C, the third lens 213C, the fourth lens 215C and the fifth lens 216C which include aspheric surfaces. In Table 14, k denotes a conic constant, and A, B, C, and D respectively denote fourth-order, sixth-order, eighth-order, and tenth-order aspherical coefficients.

Aspheric Surface Equation;

$$Z = \frac{ch^2}{1+\sqrt{1-(1+k)c^2h^2}} + Ah^4 + Bh^6 + Ch^8 + Dh^{10} + \alpha(x^3+y^3) + \beta(x^5+y^5)$$

TABLE 14

| | K | A | B | C | D |
|---|---|---|---|---|---|
| 1 | | | | | |
| 2 | | | | | |
| 3 | | | | | |
| 4 | | | | | |
| 5 | −0.94 | 0.00683 | −0.000681 | | |
| 6 | −0.202 | 0.00562 | −0.000806 | | |
| 7 | | | | | |
| 8 | | | | | |
| 9 | −6.43 | −0.00742 | 0.000886 | | |

Accordingly, in the image pickup lens unit shown in examples 3 to 5, high image-forming performance can be achieved.

Figure 18B:
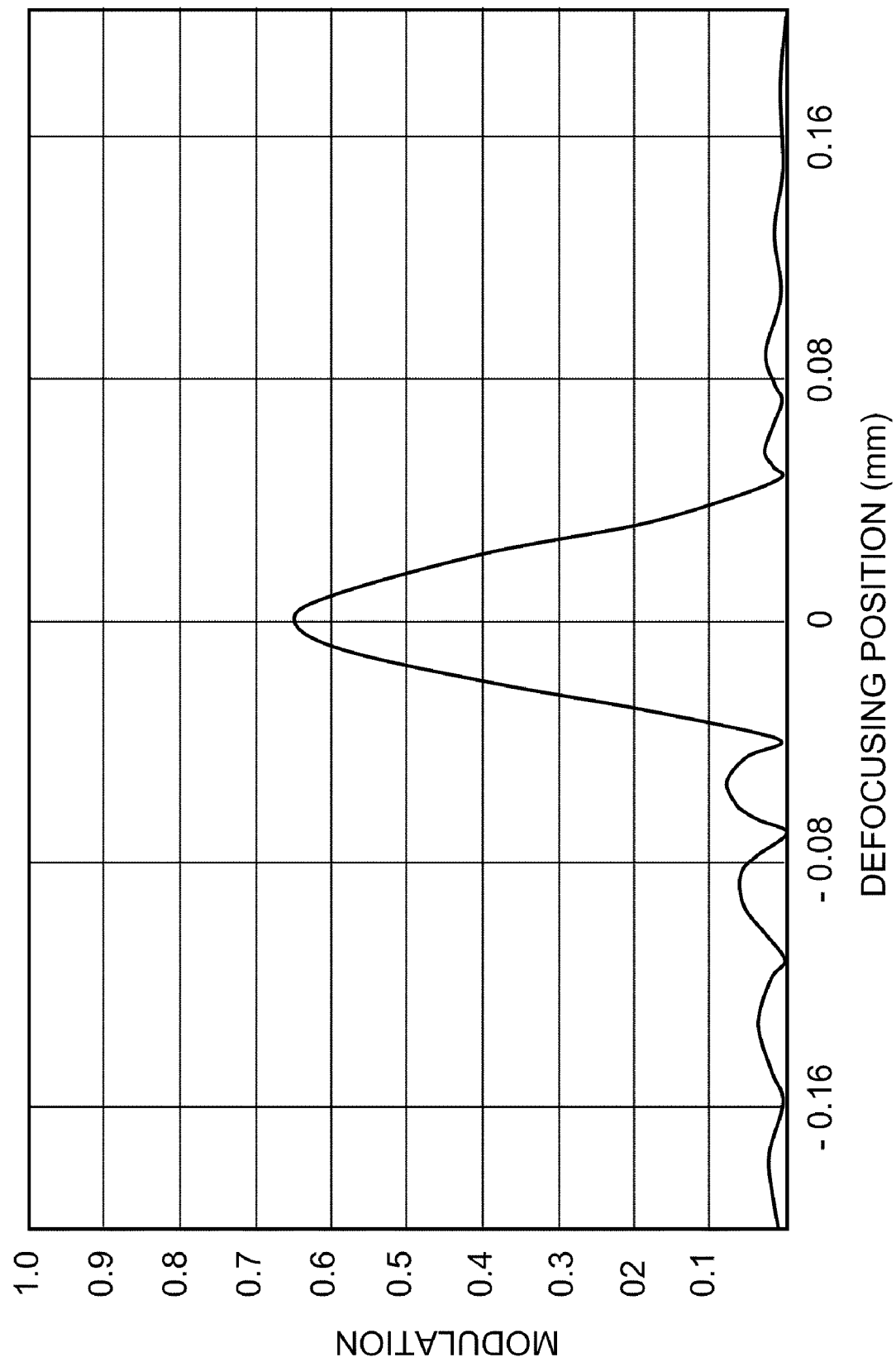

FIGS. 18A to 18D illustrate back-focus position shift occurring in response to a temperature change when the plastic lens has reduced power in example 4. The focal length of the plastic lens in FIG. 18A is about 25.0 mm. FIG. 18B illustrates a center MTF at normal temperature. FIG. 18C illustrates a center MTF at high temperature (of, for example, about 65 degrees). FIG. 18D illustrates a center MTF at low temperature (of, for example, −20 degrees).

Figure 19A:
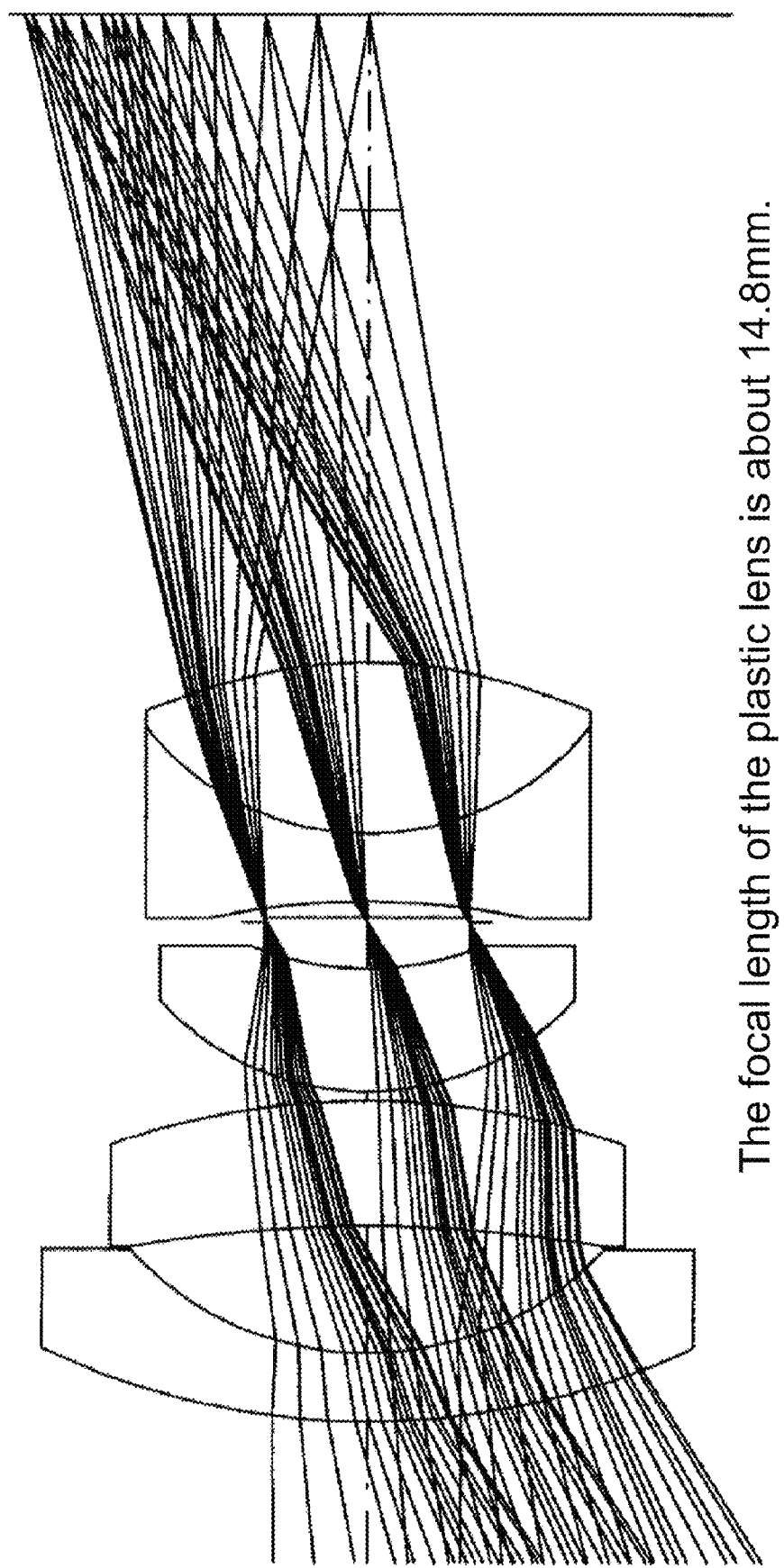
Figure 19C:
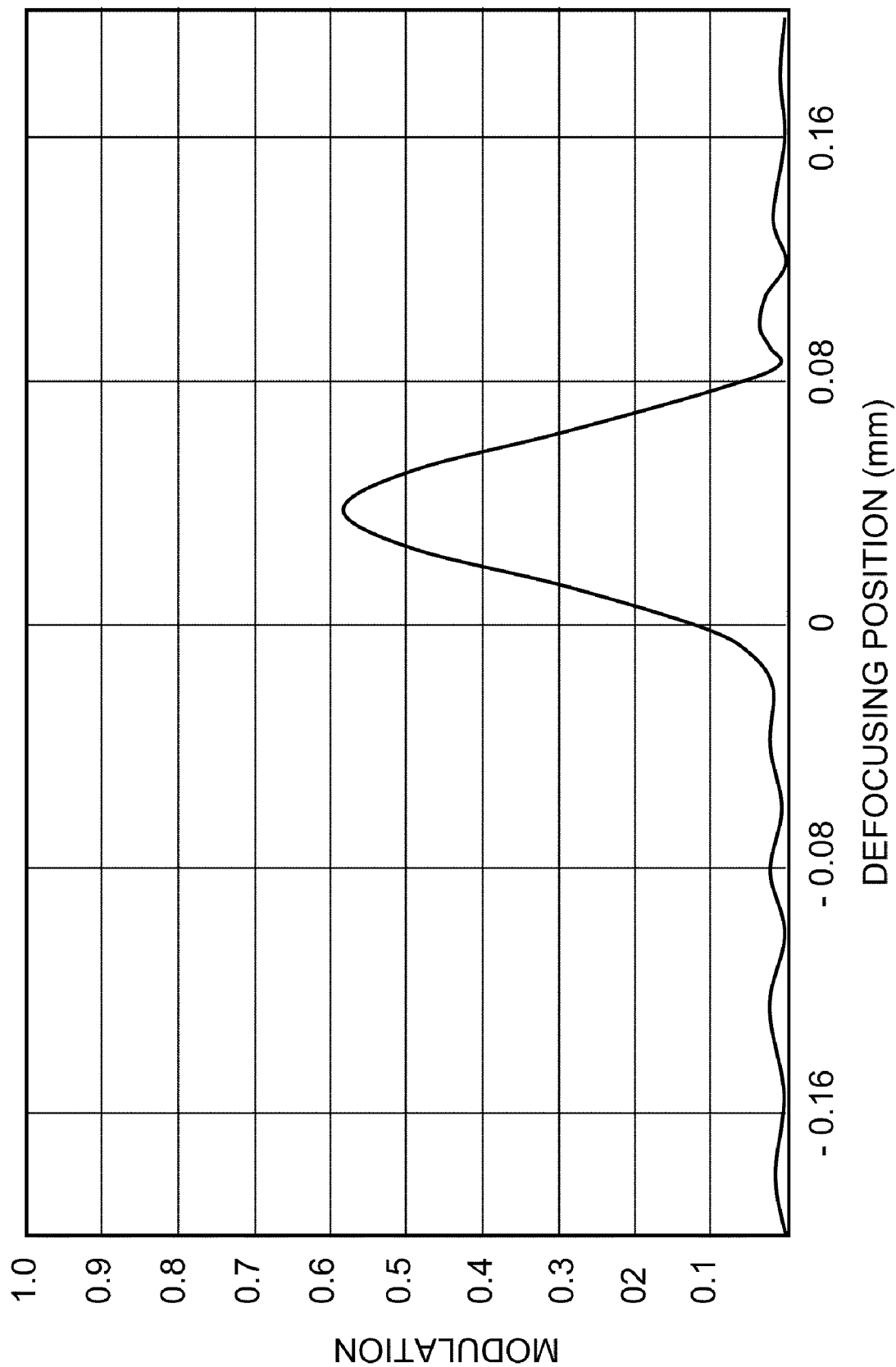

FIGS. 19A to 19D illustrate back-focus position shift occurring in response to a temperature change when the plastic lens has not reduced power in example 5. The focal length of the plastic lens in FIG. 19A is about 14.8 mm. FIG. 19B illustrates a center MTF at normal temperature. FIG. 19C illustrates a center MTF at high temperature (of, for example, about 65 degrees). FIG. 19D illustrates a center MTF at low temperature (of, for example, −20 degrees).

Comparing FIG. 18A to D with FIGS. 19A to D, the amount of back-focus shift decreases with decreasing power of the plastic lens. When the power of the plastic lens is set higher than a value equivalent to a focal length of about 15.0 mm, the back-focus changes significantly in response to a temperature change, resulting in significant performance deterioration. In particular, when this limit is exceeded with an F2.8 lens, the center MTF becomes inverted, resulting in spurious resolution.

In light of this, the power of the plastic lens is set such that the total focal length $f_{pla}$ thereof is about 15.0 mm or more in the present embodiment as described above.

The structures and functions of the optical system 210 and the image processing device 240 according to the present embodiment will be described below.

Next, the filtering procedure performed by the image processing device 240 is explained.

According to this embodiment, an optical lens used is the one that regularly disperses light converged by an optical system 210. A phase plate is inserted into the optical system 210. Due to the phase plate, an image that is not in focus at any point thereof can be formed on the image pickup device 220. In other words, the phase plate 113a forms light with a large depth (which plays a major role in image formation) and flares (blurred portions).

A system for performing digital processing of the regularly dispersed image so as to reconstruct a focused image is called a wavefront-aberration-control optical system or WFCO (Wavefrong Coding Optical System). The function of this system is provided by the image processing device 240.

In the present embodiment, a free-form surface acting as a light wavefront modulation element is formed on the image-pickup-element-side face of the second lens. However, any type of optical wavefront modulation element may be used as long as the wavefront shape can be changed. For example, an optical element having a varying thickness (e.g., a phase plate having an above-described three-dimensional curved surface), an optical element having a varying refractive index (e.g., a gradient index wavefront modulation lens), an optical element having a coated lens surface or the like so as to have varying thickness and refractive index (e.g., a wavefront modulation hybrid lens), a liquid crystal device capable of modulating the phase distribution of light (e.g., a liquid-crystal spatial phase modulation device), etc., may be used as the optical wavefront modulation element.

The principals of WFCO and wavefront modulation element are described in detail in U.S. application Ser. No. 11/755630 and PCT application JP2007/075204 entire contents of which are incorporated herein by reference in their entirety.

The structure of the image processing device 240 and the process of image processing are described below.

Referring to FIG. 5, the image processing device 240 includes a RAW buffer memory 241, a two-dimensional convolution operator unit 242, a kernel data storage ROM 143 that functions as memory means, and a convolution controller 144.

The controller 244 is controlled by the controller 290 so as to turn on/off the convolution process, control the screen size, switch kernel data and so on.

As shown in FIGS. 23 to 25, the kernel data storage ROM 243 stores kernel data for the convolution process that are calculated on the basis of a Point Spread Function (PSF) provided in advance in each of the optical systems and acquires exposure information, which is determined when the exposure settings are made by the controller 290, and the kernel data is selected through the convolution controller 244. The exposure information includes aperture information.

In the embodiment shown in FIG. 23, kernel data A corresponds to an optical magnification of 1.5, kernel data B corresponds to an optical magnification of 5, and kernel data C corresponds to an optical magnification of 10.

In the embodiment shown in FIG. 24, kernel data A corresponds to an F number, which is the aperture information, of 2.8, and kernel data B corresponds to an F number of 4. The F numbers 2.8 and 4 are out of the above-described area where the wavefront aberration is 0.5λ or less.

In the embodiment shown in FIG. 25, kernel data A corresponds to an object distance of 100 mm, kernel data B corresponds to an object distance of 500 m, and kernel data C corresponds to an object distance of 4 m.

The process of detecting the exposure information, image processing operation unit and kernel/coefficient storage register are described in details in U.S. application Ser. No. 11/755630 and PCT application JP2007/075204 the content of which is incorporated by reference herein in its entirety.

Figure 26:
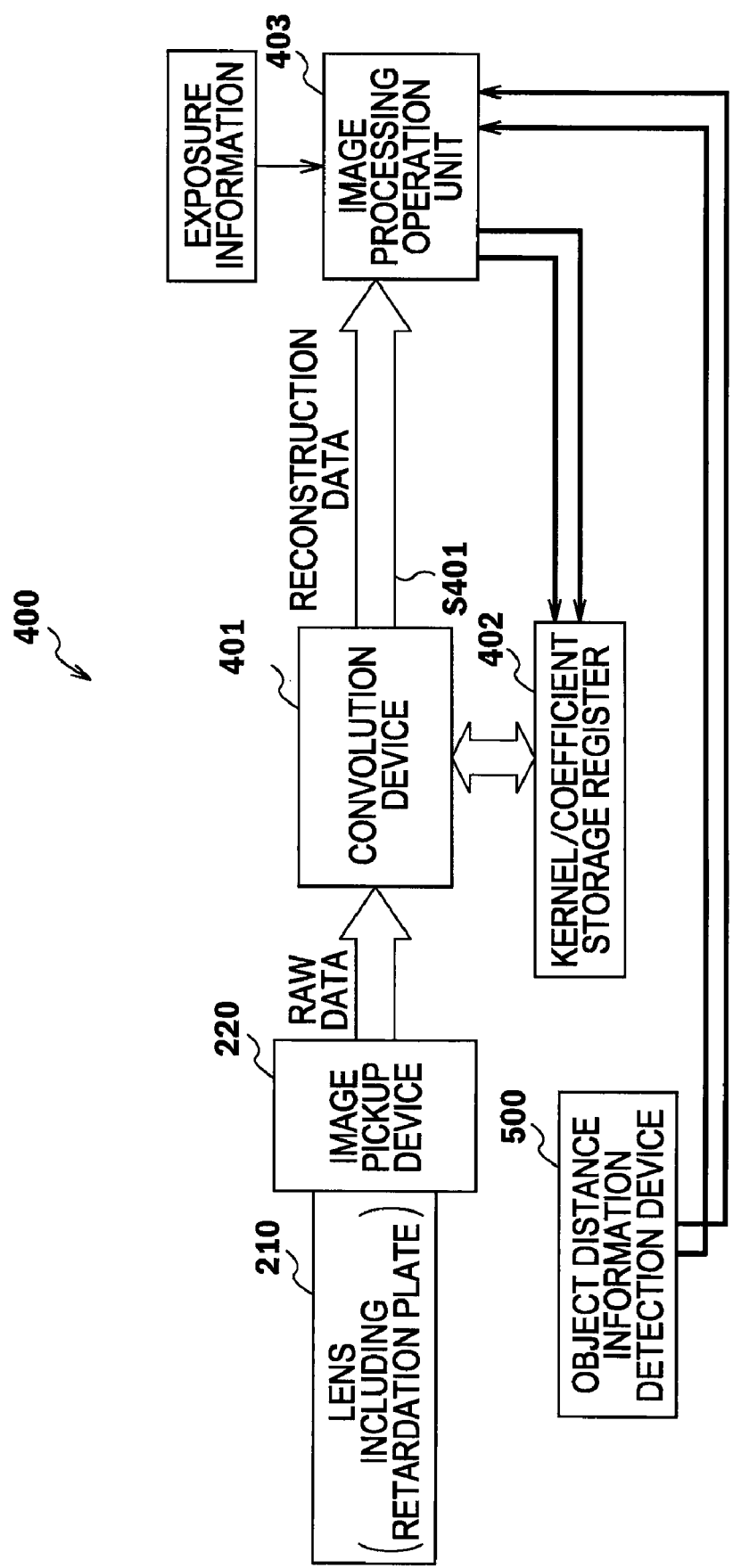
FIG. 26 illustrates an exemplary schematic block diagram of an image processing device in which object distance information and exposure information are used in combination.

FIG. 26 shows an exemplary image processing device 300 in which the object distance information and the exposure information are used in combination.

As shown in FIG. 26, the image pickup apparatus 400 includes a convolution device 401, a kernel/coefficient storage register 402, and an image processing operation unit 403.

The image processing operation unit 403 reads information regarding an approximate distance to the object and exposure information from an object-distance-information detection device 500, and determines a kernel size and a coefficient for use in an operation suitable for the object position. The image processing operation unit 403 stores the kernel size and the coefficient in the kernel/coefficient storage register 402. The convolution device 401 performs the suitable operation using the kernel size and the coefficient so as to reconstruct the image.

In the present embodiment, the object-distance-information detection device 500 which includes a distance-detecting censor can detect the distance from the main object, and the different image processing can be performed on the basis of the detected distance.

The above-described image processing is performed by the convolution operation. To achieve the convolution operation, a single common operation coefficient may be stored and a correction coefficient may be stored in association with the focal distance. In such a case, the operation coefficient is corrected using the correction coefficient so that a suitable convolution operation can be performed using the corrected operation coefficient. Alternatively, the following structures may also be used.

That is, a kernel size and an operation coefficient for the convolution operation may be directly stored in advance in association with the focal distance, and the convolution operation may be performed using the thus-stored kernel size and operation coefficient. Alternatively, the operation coefficient may be stored in advance as a function of focal distance. In this case, the operation coefficient to be used in the convolution operation may be calculated from this function in accordance with the focal distance.

More specifically, in the apparatus shown in FIG. 26, the following structure may be used.

The kernel/coefficient storage register 402 functions as conversion-coefficient storing means and stores at least two conversion coefficients corresponding to the aberration caused by the phase plate which corresponds to a plastic lens. The image processing operation unit 403 functions as coefficient-selecting means for selecting one of the conversion coefficients stored in the kernel/coefficient storage register 402, based on the information generated by the object-distance-information detection device 500.

Then, the convolution device 401, which functions as converting means, converts the image signal using the conversion coefficient selected by the image processing operation unit 403 which functions as the coefficient-selecting means.

Alternatively, as described above, the image processing operation unit 403 functions as conversion-coefficient calculating means and calculates the conversion coefficient on the basis of the information generated by the object-distance-information detection device 500 which functions as the object-distance-information generating means. The thus-calculated conversion coefficient is stored in the kernel/coefficient storage register 402.

Then, the convolution device 401, which functions as the converting means, converts the image signal on the basis of the conversion coefficient obtained by the image processing operation unit 403, which functions as the conversion-coefficient calculating means, and stored in the kernel/coefficient storage register 402.

Alternatively, the kernel/coefficient storage register 402 functions as correction-value storing means and stores at least one correction value in association with the zoom position or the amount of zoom of the optical system 210 including zoom function. The correction value includes a kernel size of an object aberration image.

Then, the image processing operation unit 403 functions as correction-value selecting means and selects a correction value, which corresponds to the distance from the object, from one or more correction values stored in the kernel/coefficient storage register 402, which functions as the correction-value storing means, on the basis of the information generated by the object-distance-information detection device 500 that functions as the object-distance-information generating means.

The convolution device 401, which functions as the converting means, converts the image signal using the conversion coefficient obtained from the kernel/coefficient storage register 402, which functions as the second conversion-coefficient storing means, and the correction value selected by the image processing operation unit 403, which functions as the correction-value selecting means.

Although this embodiment described above is directed to an example where only a second lens 212 is a plastic lens, one of the lenses other than the second lens 212 may be a plastic lens. As another alternative, two or more lenses of the second to fourth lenses may be plastic lenses so long as the power of each of the plastic lenses is set lower than the power of each glass lens and the total power of the plastic lenses is set lower than the power of the optical system.

Furthermore, since the first lens 211 located at the object side and the fourth lens located at the image-pickup-element side can directly come into contact with an object or with outside air, these lenses may be glass lenses for the purpose of preventing scratches and corrosion. In that case, the plastic lenses are sealed within a space formed by the glass lenses and the lens barrel so as to be less affected by the surrounding environment.

A lens configuration other than the lens configuration comprising four or five lenses is also permissible. For example, a lens configuration having six or more lenses is also permissible.

Furthermore, the kernel size and the operation coefficient used in the convolution operation may be set to be variable, and a suitable kernel size and operation coefficient can be determined on the basis of the inputs from the operating unit 280 and the like. Accordingly, it is not necessary to take the magnification and defocus area into account in the lens design and the reconstructed image can be obtained by the convolution operation with high accuracy.

In addition, a natural image in which the object to be shot is in focus can be obtained without using a complex, expensive, large optical lens or driving the lens.

The image pickup apparatus 200 may be applied to a small, light, inexpensive WFCO for use in consumer appliances such as digital cameras and camcorders, and the like.

In addition, the structure of the optical system 210 can be simplified and the optical system 210 can be easily manufactured. Furthermore, the costs can be reduced.

In the case in which a CCD or a CMOS sensor is used as the image pickup device 220, the resolution has a limit determined by the pixel pitch. If the resolution of the optical system is equal to or more than the limit, phenomenon like aliasing occurs and adversely affects the final image, as is well known.

Although the contrast is preferably set as high as possible to improve the image quality, a high-performance lens system is required to increase the contrast.

However, aliasing occurs, as described above, in the case in which a CCD or a CMOS sensor is used as the image pickup device 220. In the known image pickup apparatus, to avoid the occurrence of aliasing, a low-pass filter composed of a uniaxial crystal system is additionally used. Although the use of the low-pass filter is correct, since the low-pass filter is made of crystal, the low-pass filter is expensive and is difficult to manage. In addition, when the low-pass filter is used, the structure of the optical system becomes more complex.

As described above, although images with higher definitions are demanded, the complexity of the optical system must be increased to form high-definition images in the known image pickup apparatus. When the optical system becomes complex, the manufacturing process becomes difficult. In addition, when an expensive low-pass filter is used, the costs are increased.

Figure 20:
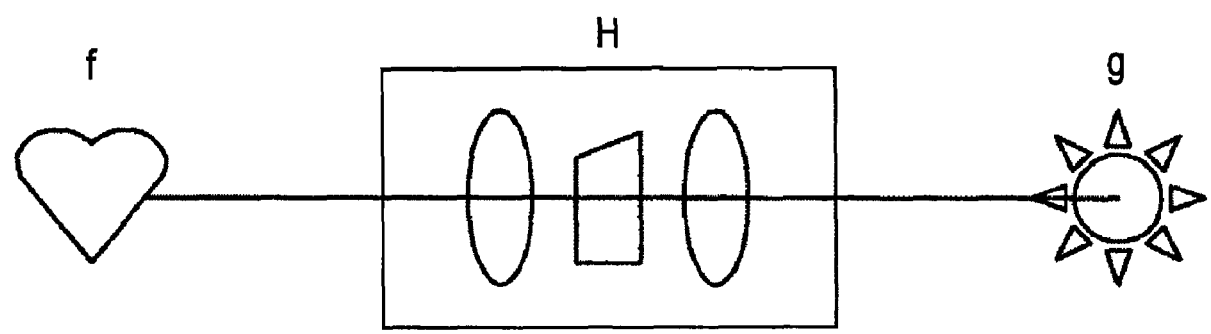
FIG. 20 illustrates the principle of a Wavefront Coding Optical System (WFCO).
Figure 21:
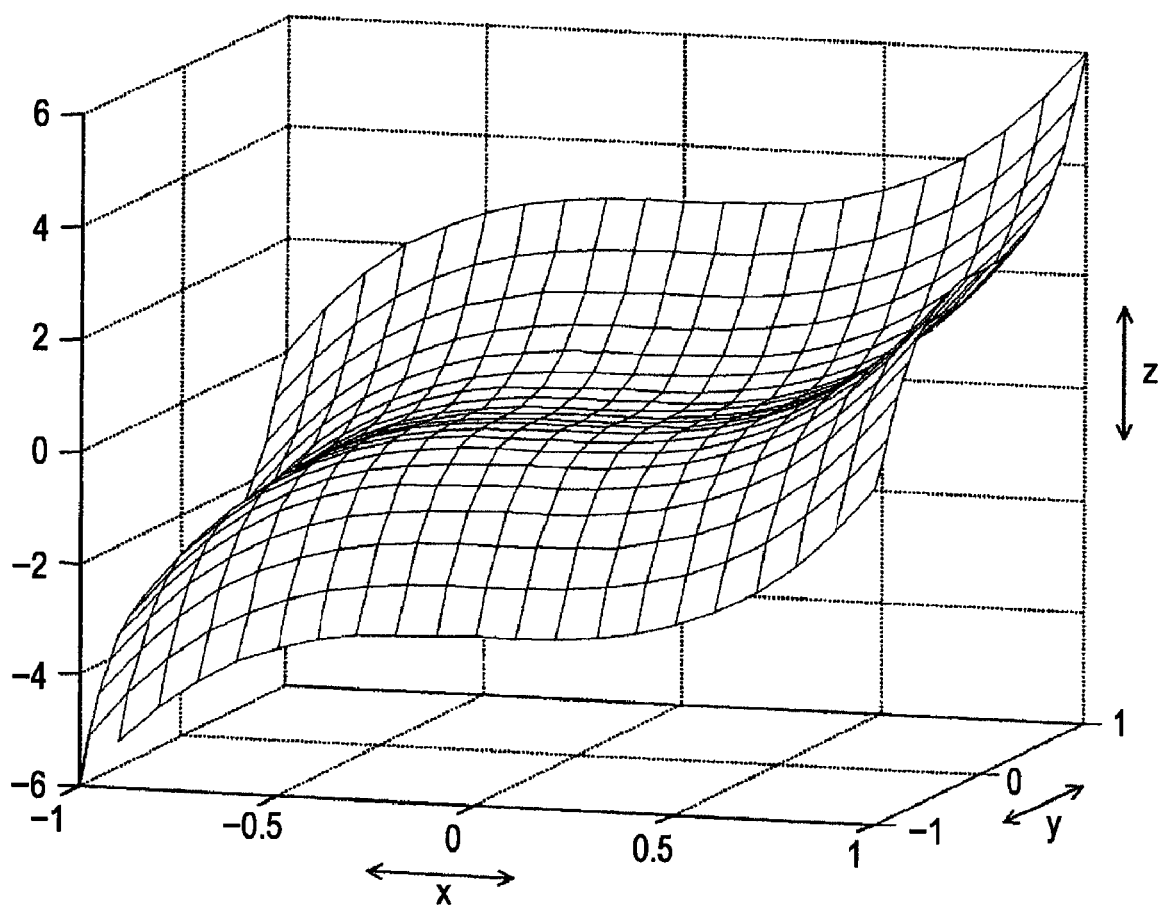
FIG. 21 is a graph showing the shape of a wavefront aberration that can be expressed by a certain equation when an optical axis of the optical system including the optical wavefront modulation element is z axis and two axes that are perpendicular to the z axis and to each other are x and y axes.
Figure 22:
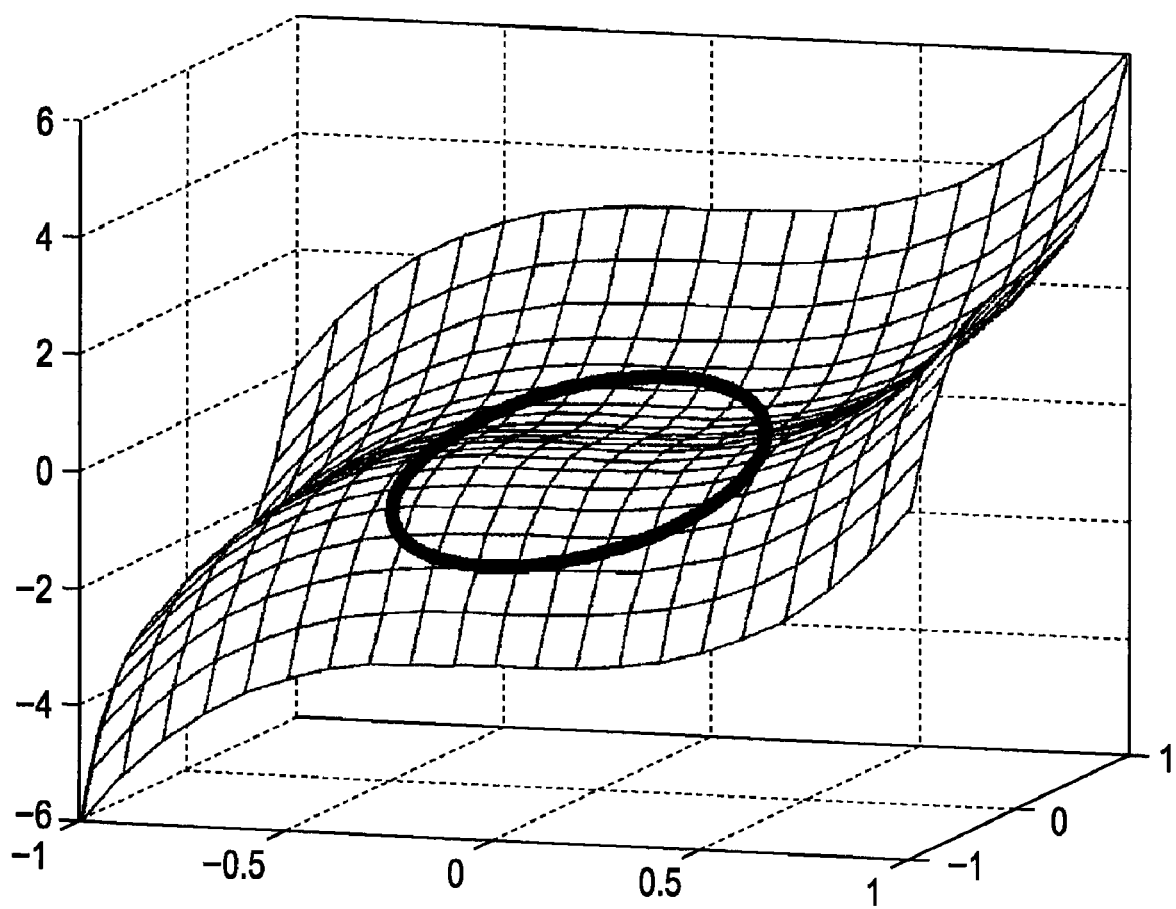
FIG. 22 is a graph showing the shape of the wavefront aberration in which the area where the wavefront aberration is $0.5\lambda$ or less is circled by a bold line.

The kernel/coefficient storage register 402 is not limited to storing the kernel sizes and values in association the optical magnification, the F number, and the object distance information, as shown in FIGS. 20 to 22. In addition, the number of kernel data elements to be prepared is not limited to three.

The image pickup apparatus 220 according to an embodiment of the invention may be used, without limitation, in digital still cameras, video cameras, digital video units, personal computers, mobile phones, personal digital assistants (PDAs), image inspection apparatuses, industrial cameras used for automatic control, and the like.

The image pickup apparatus 220 according to an embodiment of the invention are applicable, without limitation, to information code readers such as bar code readers, other electronic devices and the like.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being included within the scope of the present invention as defined by the claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An image pickup apparatus, comprising:
an optical system comprising one or more glass lenses and one or more plastic lenses, wherein a power of each of the plastic lenses is lower than a power of all of the glass lenses and a power of the optical system;
an image pickup device operable to pick up an object image that has passed through the optical system as an out-of-focus dispersed object image comprising an area with a large-depth-of-field light and a blurred area;
an image processing device operable to generate an image signal with a smaller blur than that of a signal of the out-of-focus dispersed object image;
wherein the optical system comprises an optical wavefront modulation element that modulates an optical transfer function, and a phase of the optical wavefront modulation element satisfies the following relation:

$$z = \exp\left\{i \times \left(\sum_{j=1} C_j x^m y^n\right)\right\}$$

where m and n are integers, j is an index variable and $$j = \frac{[(m+n)^2 + m + 3n]}{2},$$

$|x| \leq 1$, and $|y| \leq 1$, z is a depth from an optical axis of the optical system, x and y are directions along two axes perpendicular to the optical axis and to each other, and C is an aspheric surface coefficient.

2. The image pickup apparatus according to claim 1, wherein a first lens closest in distance on an optical axis to the imaged object comprises a glass lens.

3. The image pickup apparatus according to claim 1, further comprising a lens-supporting member, wherein a linear expansion coefficient of the lens-supporting member is smaller than that of the plastic lenses.

4. The image pickup apparatus according to claim 1, wherein a total power of the plastic lenses is positive.

5. The image pickup apparatus according to claim 2, wherein a second lens comprising a plastic lens is a second lens in distance on an optical axis to the imaged object.

6. The image pickup apparatus according to claim 2, wherein a total number of the plastic lenses and the glass lenses is four or five.

7. The image pickup apparatus according to claim 4, further comprising:
   a first holder supporting a plurality of lenses, wherein the first holder is located at a first distance on an optical axis of the optical system; and
   a second holder supporting the image pickup device, wherein the second holder is located at a second distance on the optical axis.

8. The image pickup apparatus according to claim 4, wherein an amount of change in a distance between the image pickup device and a final lens located closest to the image pickup device is substantially equal to an amount of change in back-focus position which is shifted in response to a temperature change in the optical system.

9. The image pickup apparatus according to claim 7, wherein the first distance and the second distance are at predetermined locations based on the power of the plastic lenses.

10. The image pickup apparatus according to claim 7, wherein a total focal length of the plastic lenses is about 15.0 mm or less.

11. The image pickup apparatus according to claim 7, wherein a linear expansion coefficient of the second holder is controlled so that an amount of change in a distance between the image pickup device and a final lens located closest to the image pickup device is substantially equal to an amount of change in back-focus position.

12. An information reading device, comprising:
   an image pickup apparatus operable to form an image, comprising
      an optical system comprising one or more glass lenses and one or more plastic lenses, wherein a power of each of the plastic lenses is lower than a power of all of the glass lenses and a power of the optical system,
      an image pickup device operable to pick up an object image that has passed through the optical system as a dispersed object image which is out of focus thereon and comprises an area with a large-depth-of-field light and a blurred area,
      an image processing device operable to generate an image signal with a smaller blur than that of a signal of the dispersed object image; and
   a camera signal processor operable to receive the image signal from the image pickup apparatus;
   wherein the optical system comprises an optical wavefront modulation element that modulates an optical transfer function, and a phase of the optical wavefront modulation element satisfies the following relation:

$$z = \exp\left\{i \times \left(\sum_{j=1} C_j x^m y^n\right)\right\}$$

where m and n are integers, j is an index variable and $$j = \frac{[(m+n)^2 + m + 3n]}{2},$$

$|x| \leq 1$, and $|y| \leq 1$, z is a depth from an optical axis of the optical system, x and y are directions along two axes perpendicular to the optical axis and to each other, and C is an aspheric surface coefficient.

13. The information reading device according to claim 12, further comprising a light source, wherein the information device is an information code reader.

14. The information reading device according to claim 12, wherein the information reading device comprises at least one of the group consisting of: a digital still camera, a video camera, a digital video unit, a computer, a mobile telephone, a personal digital assistant, a camera attached to a car, an image inspection apparatus, and an industrial camera used for automatic control.

15. The information reading device according to claim 12, wherein a total power of the plastic lenses is positive.

16. The information reading device according to claim 12, further comprising a lens-supporting member, wherein a linear expansion coefficient of the lens-supporting member is smaller than that of the plastic lenses.

17. An image pickup apparatus, comprising:
   an optical system comprising one or more glass lenses and one or more plastic lenses, wherein the power of each of the plastic lenses is lower than that of all of the glass lenses and that of the optical system;
   image pickup means operable to pick up an object image that has passed through the optical system as a dispersed object image which is out of focus thereon and comprise an area with a large-depth-of-field light and a blurred area;
   image processing means operable to generate an image signal with a smaller blur than that of a signal of the dispersed object image;
   wherein the optical system comprises an optical wavefront modulation element that modulates an optical transfer function, and a phase of the optical wavefront modulation element satisfies the following relation:

$$z = \exp\left\{i \times \left(\sum_{j=1} C_j x^m y^n\right)\right\}$$

where m and n are integers, j is an index variable and $$j = \frac{[(m+n)^2 + m + 3n]}{2},$$

$|x| \leq 1$, and $|y| \leq 1$, z is a depth from an optical axis of the optical system, x and y are directions along two axes perpendicular to the optical axis and to each other, and C is an aspheric surface coefficient.

18. The image pickup apparatus according to claim 17, wherein the total power of the plastic lenses is positive.

19. The image pickup apparatus according to claim 17, further comprising a lens-supporting member, wherein the linear expansion coefficient of the lens-supporting member is smaller than that of the plastic lenses.

* * * * *